US008330122B2

(12) United States Patent
Smith et al.

(10) Patent No.: US 8,330,122 B2
(45) Date of Patent: Dec. 11, 2012

(54) AUTHENTICATABLE MARK, SYSTEMS FOR PREPARING AND AUTHENTICATING THE MARK

(75) Inventors: Karl J Smith, Sparta, NJ (US); Paul G Vahey, Seattle, WA (US); Howard A Fraenkel, Lebanon, NJ (US); Robert G Bray, Bridgewater, NJ (US); Nelson W Lytle, Bolingbrook, IL (US); William R Rapoport, Bridgewater, NJ (US); Gerald A Smith, Easton, PA (US)

(73) Assignee: Honeywell International Inc, Morristown, NJ (US)

( * ) Notice: Subject to any disclaimer, the term of this patent is extended or adjusted under 35 U.S.C. 154(b) by 0 days.

(21) Appl. No.: 11/948,071

(22) Filed: Nov. 30, 2007

(65) Prior Publication Data

US 2009/0141961 A1 Jun. 4, 2009

(51) Int. Cl.
*G06K 9/00* (2006.01)
(52) U.S. Cl. .................................. 250/458.1
(58) Field of Classification Search ............... 250/458.1
See application file for complete search history.

(56) References Cited

U.S. PATENT DOCUMENTS

| | | | | |
|---|---|---|---|---|
| 4,785,290 A * | 11/1988 | Goldman | ...................... | 340/5.86 |
| 4,820,912 A * | 4/1989 | Samyn | ........................... | 235/449 |
| 6,232,124 B1 * | 5/2001 | Selinfreund | ................... | 436/20 |
| 6,234,537 B1 | 5/2001 | Gutmann et al. | ............... | 283/86 |
| 6,245,711 B1 | 6/2001 | Halbrook, Jr. | ................ | 503/206 |
| 6,264,782 B1 | 7/2001 | Oshima et al. | ............... | 156/237 |
| 6,274,873 B1 | 8/2001 | Outwater et al. | .......... | 250/458.1 |
| 6,306,929 B1 | 10/2001 | Amon et al. | .................. | 523/160 |
| 6,397,353 B1 | 5/2002 | Orlidge et al. | .................. | 714/25 |
| 6,438,468 B1 | 8/2002 | Muxlow et al. | .................... | 701/3 |
| 6,458,595 B1 * | 10/2002 | Selinfreund | .................... | 436/20 |
| 6,470,093 B2 | 10/2002 | Liang | ............................ | 382/135 |
| 6,484,948 B1 | 11/2002 | Sonoda | ........................ | 235/492 |
| 6,501,392 B2 | 12/2002 | Gremmert et al. | ........... | 340/971 |
| 6,530,527 B1 | 3/2003 | Ahlers et al. | .................... | 235/491 |
| 6,530,602 B1 | 3/2003 | Stenzel et al. | ............... | 283/114 |
| 6,580,353 B1 | 6/2003 | Geber et al. | ................. | 340/5.61 |
| 6,603,871 B2 | 8/2003 | Liang | ............................ | 382/135 |
| 6,608,670 B2 | 8/2003 | Nottke et al. | ................... | 356/71 |
| 6,624,741 B1 | 9/2003 | Dais et al. | .................... | 340/5.72 |
| 6,624,760 B1 | 9/2003 | Kinzel et al. | ............ | 340/870.11 |

(Continued)

FOREIGN PATENT DOCUMENTS

CN 1947126 A 4/2007

(Continued)

*Primary Examiner* — David Porta
*Assistant Examiner* — Djura Malevic
(74) *Attorney, Agent, or Firm* — Ingrassia Fisher & Lorenz, P.C.

(57) ABSTRACT

Systems for preparation of a mark and authentication of a mark vis-a-vis a counterfeit mark. Emission spectra comprising intensity versus wavelength distributions are collected from a series of taggants. One or more taggants is selected from the collected emission data such that the spectra of the selected taggants are distinguishable. The selection is also based on a consideration of the emitted radiation of a substrate and a dispersive medium. The authentication system uses multivariate statistical analysis to calculate at least one measurement statistic of a mark to be authenticated and at least one statistical limit based on a series of training marks prepared by the preparation system. Authenticity of the mark is determined based on a comparison of the measurement statistic and the statistical limit.

27 Claims, 18 Drawing Sheets

U.S. PATENT DOCUMENTS

| | | | |
|---|---|---|---|
| 6,632,773 B1 | 10/2003 | Kranz et al. | 503/201 |
| 6,666,991 B1 | 12/2003 | Atarashi et al. | 252/301.4 R |
| 6,677,888 B2 | 1/2004 | Roy | 342/36 |
| 6,697,315 B1 | 2/2004 | Edward et al. | 369/100 |
| 6,700,475 B1 | 3/2004 | Geber et al. | 340/5.61 |
| 6,741,336 B2 | 5/2004 | Ahlers et al. | 356/71 |
| 6,760,440 B1 | 7/2004 | Driscoll | 380/37 |
| 6,850,592 B2 * | 2/2005 | Schramm et al. | 378/45 |
| 7,067,824 B2 * | 6/2006 | Muller et al. | 250/458.1 |
| 7,194,369 B2 * | 3/2007 | Lundstedt et al. | 702/104 |
| 7,279,234 B2 * | 10/2007 | Dean | 428/690 |
| 7,892,338 B2 | 2/2011 | Degott et al. | |
| 2001/0014169 A1 | 8/2001 | Liang | 382/135 |
| 2001/0054644 A1 | 12/2001 | Liang | 235/454 |
| 2002/0046248 A1 | 4/2002 | Drexler | 709/206 |
| 2002/0048013 A1 | 4/2002 | Nottke et al. | 356/71 |
| 2002/0058138 A1 | 5/2002 | Kim et al. | 428/364 |
| 2002/0106811 A1 | 8/2002 | Jefferson | 436/172 |
| 2002/0122878 A1 | 9/2002 | Kerns et al. | 427/8 |
| 2003/0030581 A1 | 2/2003 | Roy | 342/36 |
| 2003/0080193 A1 | 5/2003 | Ryan et al. | 235/491 |
| 2003/0102662 A1 | 6/2003 | Stenzel et al. | 283/114 |
| 2003/0112623 A1 | 6/2003 | Yu et al. | 362/118 |
| 2003/0194052 A1 | 10/2003 | Price et al. | 378/45 |
| 2003/0194053 A1 * | 10/2003 | Schramm et al. | 378/45 |
| 2003/0194578 A1 | 10/2003 | Tam et al. | 428/690 |
| 2004/0023397 A1 | 2/2004 | Vig et al. | 436/1 |
| 2004/0031931 A1 * | 2/2004 | Muller et al. | 250/458.1 |
| 2004/0095271 A1 | 5/2004 | Stangeland et al. | 342/357.02 |
| 2004/0103323 A1 | 5/2004 | Dominic | 726/4 |
| 2004/0120857 A1 | 6/2004 | Smith et al. | 422/82.05 |
| 2004/0125988 A1 * | 7/2004 | Coetzee et al. | 382/112 |
| 2004/0233465 A1 * | 11/2004 | Coyle et al. | 358/1.9 |
| 2005/0109983 A1 * | 5/2005 | Pai-Paranjape et al. | 252/299.01 |
| 2005/0239207 A1 * | 10/2005 | Gelbart | 436/56 |
| 2006/0131517 A1 * | 6/2006 | Ross et al. | 250/556 |
| 2006/0131518 A1 * | 6/2006 | Ross et al. | 250/556 |
| 2007/0023715 A1 * | 2/2007 | Ross et al. | 250/556 |
| 2007/0023765 A1 * | 2/2007 | Thomas et al. | 257/81 |
| 2007/0205284 A1 * | 9/2007 | Ross | 235/454 |

FOREIGN PATENT DOCUMENTS

| | | |
|---|---|---|
| EP | 0065743 | 12/1982 |
| EP | 0072882 | 3/1983 |
| EP | 0083529 | 7/1983 |
| EP | 0084409 | 7/1983 |
| EP | 0090789 | 10/1983 |
| EP | 0091082 | 10/1983 |
| EP | 0096479 | 12/1983 |
| EP | 0098076 | 1/1984 |
| EP | 1073906 | 2/2001 |
| EP | 1116164 | 7/2001 |
| EP | 1138743 | 10/2001 |
| EP | 1168253 | 1/2002 |
| EP | 1179807 | 2/2002 |
| EP | 1204795 | 5/2002 |
| EP | 1234403 | 8/2002 |
| EP | 1252602 | 10/2002 |
| EP | 0074319 | 3/2003 |
| EP | 1330073 | 7/2003 |
| EP | 1548363 | 8/2003 |
| EP | 1374157 | 1/2004 |
| EP | 1200932 | 9/2006 |
| EP | 1236304 | 2/2008 |
| GB | 2383590 | 2/2003 |
| GB | 2382546 | 4/2003 |
| JP | 200143419 | 2/2001 |
| JP | 2001216395 | 8/2001 |
| JP | 2001257672 | 9/2001 |
| JP | 2001330935 | 11/2001 |
| JP | 2001330936 | 11/2001 |
| JP | 200288282 | 3/2002 |
| JP | 200297400 | 4/2002 |
| JP | 2002189433 | 7/2002 |
| JP | 2002297305 | 10/2002 |
| JP | 2003131574 | 5/2003 |
| JP | 2003199729 | 7/2003 |
| JP | 2005246821 | 9/2005 |
| WO | WO 9501579 | 1/1995 |
| WO | WO 9638509 | 12/1996 |
| WO | 9721186 | 6/1997 |
| WO | WO 9722896 | 6/1997 |
| WO | WO 9825181 | 6/1998 |
| WO | WO 0106453 | 1/2001 |
| WO | WO 0109435 | 2/2001 |
| WO | WO 0127699 | 4/2001 |
| WO | WO 0138858 | 5/2001 |
| WO | WO 0143340 | 6/2001 |
| WO | WO 0148594 | 7/2001 |
| WO | WO 0150676 | 7/2001 |
| WO | WO 0177877 | 10/2001 |
| WO | WO 0201513 | 1/2002 |
| WO | WO 0211126 | 2/2002 |
| WO | WO 0231682 | 4/2002 |
| WO | WO 0241566 | 5/2002 |
| WO | WO 02066261 | 8/2002 |
| WO | WO 03018710 | 3/2003 |
| WO | WO 03044278 | 5/2003 |
| WO | WO 03045782 | 6/2003 |
| WO | WO 03052025 | 6/2003 |
| WO | WO 03054259 | 7/2003 |
| WO | WO 03057785 | 7/2003 |
| WO | WO 03058549 | 7/2003 |
| WO | WO 03081522 | 10/2003 |
| WO | WO 03019489 | 11/2003 |
| WO | WO 03099039 | 12/2003 |
| WO | WO 03107153 | 12/2003 |
| WO | WO 03107154 | 12/2003 |
| WO | WO 03107155 | 12/2003 |
| WO | WO 03107156 | 12/2003 |
| WO | WO 03107626 | 12/2003 |
| WO | WO 2004013795 | 2/2004 |
| WO | WO 2004013805 | 2/2004 |
| WO | WO 2004029144 | 4/2004 |
| WO | WO 2004047405 | 6/2004 |
| WO | 2005104008 A1 | 11/2005 |

* cited by examiner

AUTHENTICATABLE MARK, SYSTEMS FOR PREPARING AND AUTHENTICATING THE MARK

FIELD OF THE INVENTION

This invention relates to an authenticatable mark, a system and method for preparing the authenticatable mark and a system for authenticating a true mark and rejecting a counterfeit mark.

BACKGROUND OF THE INVENTION

In the commercial marketplace there exists a need for methods to establish the authenticity of articles of commerce between the time that they have been manufactured and their sale to an end user, or even beyond, to the time of their disposal. A variety of benefits are attained when an article or its packaging is provided with an identity mark or marks, including the ability to track and trace a specific article, to confirm or refute the identity of stolen, diverted, or counterfeited articles and/or their packaging. Numerous methods have been employed over the course of time to accomplish this; the simplest methods include a variety of overtly printed identifying text, trademarks, logos, symbols, images, or other identifying indicia. More covert identification methods are often employed in order to defeat the illegitimate diversion, counterfeiting or theft of articles having value sufficient to induce these behaviors.

Examples of covert methods include micro-printing, with printed characters too small for the unaided human eye to identify; images super- or sub-imposed over or under other images; marks made with fluorescent materials identifiable upon activation by a light source by the emitted visible fluorescent color, or with a wavelength of emission measurable by a spectrofluorimeter or simpler detection device, holograms, RFID tags, encoded text, markings or symbology susceptible of detection by decoding methods such as bar code readers, character recognition readers, and the like.

Fluorescent materials have been used in security applications as invisible, covert taggants in marks for authentication of items. The color and wavelength of the fluorescence, as well as the shape and size of the marks, are used to verify the authenticity of the item. Counterfeiters attempt to reproduce such a mark by matching its shape, size, color, wavelength and other distinguishing characteristics.

Therefore, there is a need for an authenticatable mark comprising a taggant that exhibit properties that can be authenticated.

There is also a need for a system and a method to prepare the marks.

There is a further need for a system and a method for reliably authenticating the marks.

SUMMARY OF THE INVENTION

A system of the present invention authenticates a mark that comprises a plurality of taggants. At least one energy source provides energy at one or more wavelengths that stimulates the taggants to emit radiation with one or more intensity versus wavelength distributions. A detection apparatus measures the emitted intensity versus wavelength distributions and provides at least one output signal corresponding to the intensity versus wavelength distributions. A device including a program that performs a multivariate statistical analysis of the output signal to determine authenticity of the mark based on a measurement statistic and a predetermined statistical limit and a confidence limit. The device may be a computer or any other type of machine that is capable of following the instructions of a program.

In one embodiment of the system of the present invention, the predetermined statistical confidence limit is derived by the multivariate statistical analysis of a set of reference taggants that are known to be authentic and correspond to the taggants, and wherein the predetermined statistical limit is selected from the group consisting of: a Q-residual limit, a Mahalanobis distance limit, a Hotelling's $T^2$ limit and any combination thereof.

In one embodiment of the system of the present invention, the taggants are carried by a substrate.

In another embodiment of the system of the present invention, the plurality of taggants comprises two taggants In another embodiment of the system of the present invention, the system further comprises an output device that notifies a user of the authenticity of the mark.

In another embodiment of the system of the present invention, the detection apparatus is selected from the group consisting of: a detector that detects and filters the output signal, and a spectrometer that measures the emitted intensity versus wavelength distributions and provides the output signal.

In another embodiment of the system of the present invention, the taggant comprises fluorescent materials.

In another embodiment of the system of the present invention, the multivariate statistical analysis is selected from the group consisting of: Principal Components Analysis (PCA), and other vector based statistical techniques, discriminate analysis, classical least squares (CLS), net analyte signal (NAS), principal components regression (PCR), partial least squares (PLS), soft independent modeling of class analogy (SIMCA), and multi-way statistical tools, including, but not limited to, tri-linear decomposition (TLD), parallel factor analysis (PARAFAC), Tucker models and multi-way PCA (MPCA).

In another embodiment of the system of the present invention, the energy source stimulates the taggants with radiation in regions of the electromagnetic spectrum selected from the group consisting of: X-Ray, ultraviolet (UV), visible, near infrared (NIR), infrared (IR) and Raman.

In another embodiment of the system of the present invention, a detector detects the emitted radiation. A filter filters the detected radiation and provides at least one output signal corresponding to the intensity versus wavelength distributions. An output device notifies a user of the authenticity of the mark.

A method of the present invention authenticates a mark comprising a plurality of taggants. Energy is provided at one or more wavelengths to stimulate the taggants to emit radiation with one or more intensity versus wavelength distributions. The emitted radiation is detected. At least one output signal is provided corresponding to the intensity versus wavelength distributions. A program is executed on a device that performs a multivariate statistical analysis of the output signal to provide a measurement statistic and determines authenticity of the mark based on the measurement statistic and at least one predetermined statistical confidence limit.

In one embodiment of the method of the present invention, the predetermined statistical confidence limit is derived by the multivariate statistical analysis of a set of reference taggants that are known to be authentic and correspond to the taggants, and wherein the predetermined statistical limit is selected from the group consisting of: a Q-residual limit, a Mahalanobis distance limit, a Hotelling's $T^2$ limit and any combination thereof.

In another embodiment of the method of the present invention, the reference taggants have been subjected to natural or artificially induced aging.

In another embodiment of the method of the present invention, the taggants are carried by a substrate.

In another embodiment of the method of the present invention, the taggants comprise two taggants.

In another embodiment of the method of the present invention, the taggants comprise a structure selected from the group consisting of: blend, layered, interspersed and patterned regions.

In another embodiment of the method of the present invention, a user is notified of the authenticity of the mark.

In another embodiment of the method of the present invention, the taggants comprise fluorescent materials.

In another embodiment of the method of the present invention, the multivariate statistical analysis is selected from the group consisting of: Principal Components Analysis (PCA), and other vector based statistical techniques, discriminate analysis, classical least squares (CLS), net analyte signal (NAS), principal components regression (PCR), partial least squares (PLS), soft independent modeling of class analogy (SIMCA), and multi-way statistical tools, including, but not limited to, tri-linear decomposition (TLD), parallel factor analysis (PARAFAC), Tucker models and multi-way PCA (MPCA).

In another embodiment of the method of the present invention, the taggants are stimulated with radiation in regions of the electromagnetic spectrum selected from the group consisting of: X-Ray, ultraviolet (UV), visible, near infrared (NIR), infrared (IR) and Raman.

In another embodiment of the method of the present invention, the output signal is preprocessed by normalizing the intensity distributions to unit area to compensate for signal variation due to distance of the taggants from a detector that collects the emitted radiation.

In another embodiment of the method of the present invention, the stimulating step provides an excitation that is selected from the group consisting of: (a) shorter wavelength ($\lambda$), higher energy, than the emission of the taggants and (b) longer wavelength ($\lambda$), lower energy, than the emission of the taggants, including anti-stokes, up-converting materials.

A second method of the present invention applies a plurality of taggants to a substrate with steps comprising:

irradiating a series of taggants to emit radiation with intensity versus wavelength distributions;

measuring the emitted radiation of each of the taggants and recording in a taggant file of a memory of a computer a radiation intensity versus wavelength distribution for each of the taggants;

selecting a plurality of the taggants from the taggant file that have emitted radiation intensity versus wavelength distributions which are distinguishable by the method; and applying the selected taggants to the substrate.

In one embodiment of the second method of the present invention, the plurality of taggants is selected additionally based on an emission elicited by the radiation from the group consisting of: the substrate and a dispersive medium.

In another embodiment of the second method of the present invention, further steps comprise irradiating a series of substrates and a series of dispersive media, measuring for each of the substrates and each of the dispersive media an emitted radiation intensity distribution over a wavelength range at which the emission occurs for each of the taggants, recording the emitted radiation intensity distribution for each of the substrates and for each of the dispersive media in a substrate file and a dispersive medium file, respectively, and selecting the substrate and the dispersive medium from the substrate file and the dispersive medium file, respectively, so that the radiation intensity versus wavelength distributions of the selected taggants are distinguishable in the presence of the emitted radiation of the selected substrate and the selected dispersive medium.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
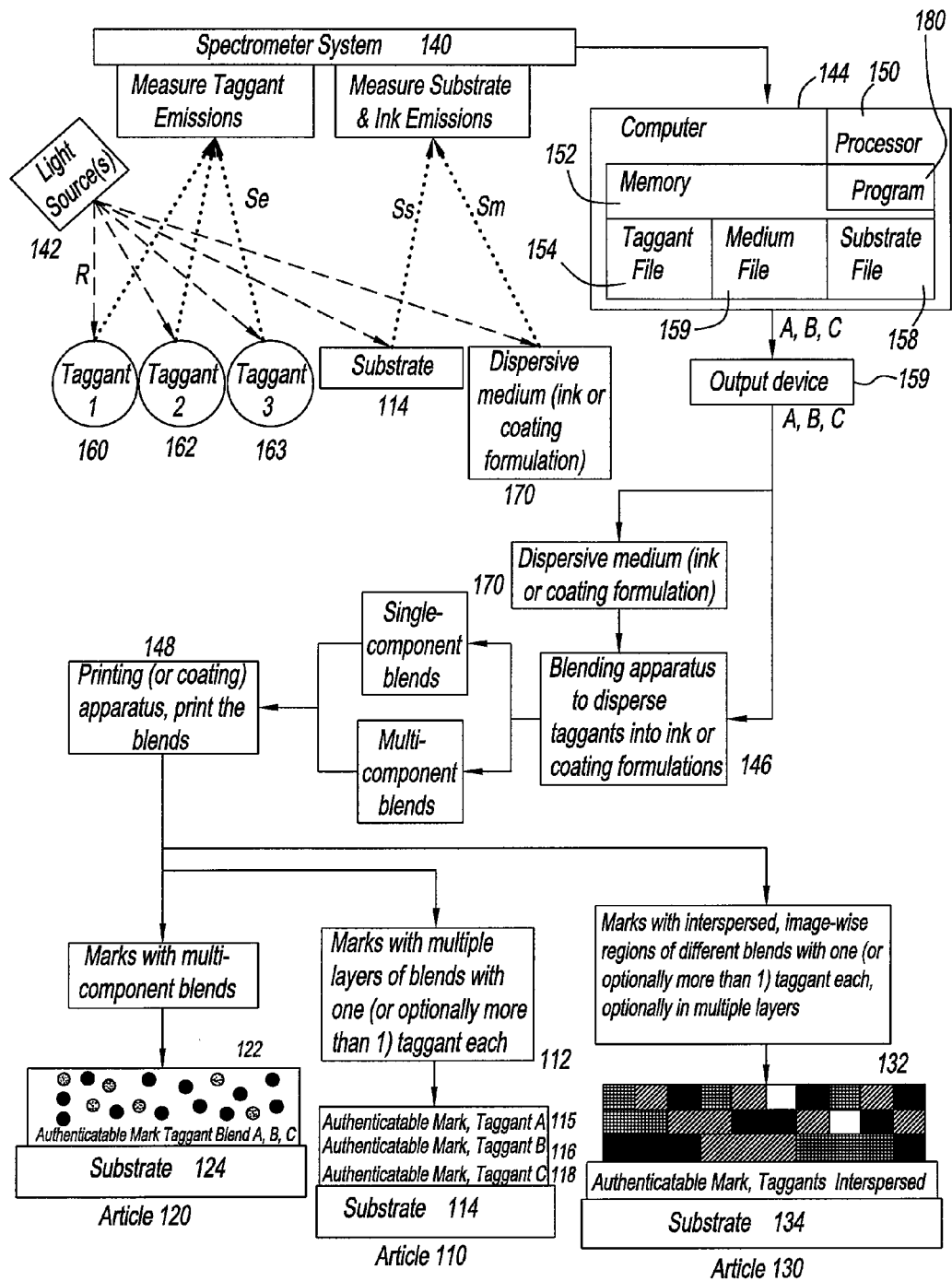
FIG. 1 is a block diagram of a marking system of the present invention.

The authentication system and method of the present invention goes beyond the aforementioned covert methods to provide an authentication methodology which utilizes chemical analytical techniques known as multivariate statistical analysis (whose use in chemistry is known as chemometrics) to evaluate and pre-qualify well-defined authentication sets made of prints, coatings, indicia, or other marks or specified and/or localized concentrations of materials which may emit a variety of detectable signals upon activation by a variety of selected activation stimuli, including, but not limited to, fluorescent signals emitted in response to excitation by incident light or electromagnetic stimulation with an energy level required to elicit the fluorescent response. Other stimuli and responses could also be used with this method, for example, chemical, electrical, magnetic, physical or time-dependent processes induced by a variety of phenomena.

The materials used to prepare the identifying region on the article to be authenticated are selected with a sufficient number and range of stimulated and emitted signals so as to render the combined signals uncharacterizable by conventional detector or spectroscopic methods. Multivariate statistical analysis of the multi-dimensional signal profiles enables the user to distinguish with a high degree of confidence among materials designated as "true" or "authentic," and "false" or "counterfeit" materials and the marks made with them. Multivariate statistical analysis techniques are commonly used to enhance analytical discrimination among complex chemical mixtures. The present invention uses multivariate statistical analysis to deliberately prepare a complex mixture for the purpose of providing secure identification and authentication of an article to which the complex mixture is applied as a preferably covert mark comprising a plurality of taggants and in one embodiment at least two taggants.

The term "taggant" is used herein to mean a material capable of disposition into or upon an article or its packaging, optionally pre-dispersed within a medium suitable for such disposition, which when stimulated, generates a detectable response. The material may comprise a dye, a pigment, or other chemical or physical entity with capability as described above. The material may further comprise a luminescent chemical substance which when stimulated by light or other electromagnetic radiation, emits fluorescent or phosphorescent radiation. The stimulus then comprises the impinging light, and the response comprises the emitted luminescent radiation. Materials which may be used as taggants may comprise Lumilux® fluorescent and phosphorescent materials, available from Honeywell International, Inc. Lumilux® materials which may be used comprise pigments and dyes with chemical compositions including organic derivatives of aldazine, anthranilic acid, barbituric acid, benzimidazole, benzoxazinone, benzthiazole, coumarin, naphthalamide, oxinate, pyrazoline, quinazolinone, quinoline, salicylic acid, terephthalic acid, thioxanthene; rare-earth chelates and complexes; inorganic compounds doped with transition metal and/or rare-earth ions, including alkali, transition metal and rare earth oxides, sulfides, oxysulfides, silicates, tungstates, vanadates. Examples of these materials include Lumilux® CD products in the numeric ranges of 101 to 199, 301 to 399, 401 to 499, 501 to 599, 701 to 799, and UC-2.

The signal to be detected and quantified, for example, a fluorescent or phosphorescent emission of light or other electromagnetic radiation, stimulated by impingement of light or other electromagnetic radiation upon the taggant, may be detected and quantified by measurement of the intensity of the emitted radiation over a range of radiation energies, typically characterized as the frequency or wavelength of the radiation. The distribution may comprise a continuous signal of intensities across the energy range, or optionally a series of values at selected discrete intervals across the energy range. Typical examples of such intensity distributions include spectra generated by a spectrometer recording the intensity of light emitted from a fluorescent material, stimulated by an excitation light source, over a range of emitted light frequencies or wavelengths; both excitation and emission spectra may be obtained similarly using a spectrofluorimeter; simpler devices, using limited arrays of, for example, silicon detectors and optical filters, may optionally be used to measure and record a series of light emission intensities over a range of discrete frequencies or wavelengths.

An authenticatable mark comprises at least two taggants which may be disposed upon or within an article, item or object, either in discrete locations upon or within said article, item or object, or disposed throughout the surface or volume of the article, item or object. Each mark comprises at least two materials that provide a detectable signal in response to a stimulus, such as electromagnetic radiation. In some embodiments, the taggants comprise a marking composition. In one embodiment, an authenticatable substrate may be created by mixing a taggant within the substrate itself. In another embodiment, an authenticatable mark may be created by applying or disposing the mark to a surface of the article, object, and/or the packaging material in which the article is contained. Various deposition or printing methods, including but not limited to offset, flexography, rotogravure, intaglio, inkjet and thermal transfer, may be used to enable the invention.

The authenticatable mark of the present invention has the advantages of covertness (i.e., not readily observable by the human eye under normal ambient lighting conditions), responsiveness to a stimulus to provide a detectable signal and difficulty to reverse engineer. Moreover, the authenticatable mark and its properties are not significantly affected by environmental forces such as exposure over periods of time to light, heat, moisture, air, oxygen, abrasive forces, or other common environmental hazards known to affect the performance of such materials. Also, there are sufficient variations of the taggant(s) and/or mark or its performance so as to be able to provide unique marks for each customer or type of article. Further, there is statistically insignificant false positive identification of articles as authentic when they are actually counterfeit. In addition, there is statistically insignificant false negative identification of articles as counterfeit when they are actually authentic.

The authentication system of the present invention comprises an excitation/activation source, which generates an energy field, which elicits a detectable emission or signal from the taggant(s) of the mark. Optionally, a device or system modifies the signal provided by the authenticatable mark, (e.g., converts the signal into a more detectable form), or diminishes (or enhances) the number, intensity or other characteristic of the signal, e.g., for improvement of the detection process efficiency or cost effectiveness. A detection device receives, measures and stores a record of the signal(s) elicited by a stimulation of the authenticatable mark.

The authentication system of the present invention interprets the signal(s) provided by the authenticatable mark with multivariate analytical techniques including but not limited to PCA, partial least squares, and similar techniques. The PCA technique processes the superposition of the emissive signals, e.g. spectra or sub-sets of spectra, and identifies regions of maximum change that provide the optimum discrimination among the signals.

The emissions from a set of authentic marks using a specific combination and/or arrangement of taggants are analyzed after activation by the excitation system to be used. A region of acceptability is defined in a series of relational matrices using PCA or comparable techniques. The means, loadings and scores of the signals are calculated, and from these are generated Q-residual matrices, Mahalanobis distance matrices and/or Hotelling's $T^2$ matrices, providing authentication limits that are entered into the detection device's memory. A mark made using a taggant combination designed to be within the bounds of the region of acceptability may then be subjected to the energy field. Its emission is detected and evaluated by the system so as to provide a response signal to the user indicating that the authentic identity has been verified. Conversely, a mark not made to conform to the authentication training set will be identified as emitting a false signal by the detection/authentication system.

By way of example, the authenticatable mark will be described herein for exemplary embodiments that use fluorescent material(s) for taggants. For example, the taggants may suitably comprise Lumilux® fluorescent materials, available from Honeywell International, Inc. These may include either "down-converting" materials for which the excitation is shorter wavelength (λ), higher energy, than the emission, or optionally materials for which the excitation is longer wavelength (λ), lower energy, than the emission, i.e., anti-stokes, up-converting materials.

Referring to FIG. 1, a marking system 100 of the present invention qualifies and prepares an authenticatable article 110, 120 or 130. Authenticatable article 110 comprises an authenticatable mark 112 carried by a substrate 114. For example, authenticatable mark 112 may be disposed on or in substrate 114. Authenticatable mark 112 comprises layers 115, 116 and 118. For example, layer 118 is adjacent to substrate 114. Layer 116 overlies layer 118 in whole or in part. Layer 115 overlies layer 116 in whole or in part.

Substrates 114, 124 and 134, e.g., may be a surface of the authenticatable article or its packaging.

Authenticatable article 120 comprises an authenticatable mark 122 disposed on a substrate 124. Authenticatable article 130 comprises an authenticatable mark 132 disposed on a substrate 134.

Marking system 100 is operable to measure and record the signal intensities at a range of wavelengths that is optimal for a plurality of taggants and to select at least two taggants and preferably at least three taggants from the recorded taggants for authenticatable mark 112, 122 or 132.

Marking system 100 comprises spectrometer system 140, one or more light sources 142, a computer 144, a blending apparatus 146 and a printing apparatus 148. Computer 144 comprises a processor 150 and a memory 152. A program 180, a taggant file 154, a medium file 156 and a substrate file 158 are stored in memory 152.

Program 180 when executed by processor 150 is operable to populate taggant file 154 with a plurality of different taggants that have peak intensities in the range of wavelengths. This measurement procedure is performed by providing radiation R at a specific wavelength from light source 142 incident on the surface of a taggant 160. For example, light source 142 may be a UV lamp selected at 365 nanometers (nm) by the use of grating. Taggant 160 responds to radiation R to provide or emit a signal Se. Spectrometer system 140 captures signal Se and measures the wavelengths at which a signal optimal intensity occurs. The signal optimal intensity and wavelength are recorded in taggant file 154. This procedure is repeated for the remainder of the taggants, of which only taggants 162 and 163 are shown.

Radiation R is also provided to a dispersive medium 170, which, for example, may be an ink or coating formulation in which the selected taggants will be dispersed. A signal Sm is provided from dispersive medium 170 and recorded by spectrometer system 140. Similar data can be gathered and stored in medium file 156 for a plurality of different dispersive media. The measured signal intensity for the wavelengths of each of the plurality of taggants 160, 162 and 163 can be optionally modified for recording in taggant file 154.

Radiation R is further provided to substrate 114 (or 124 or 134). A signal Ss is provided from substrate 114 and captured by spectrometer system 140, which optionally modifies the signal intensity for the wavelengths of each of the plurality of taggants 160, 162 and 163 for recording in substrate file 158.

Program 180 when executed also causes processor 150 to further perform a procedure that identifies (or selects) taggants from the recorded taggants in taggant file 154 with differentiable emissions (i.e., different wavelengths for optimal signal intensities). Program 180 determines the compatibility of selected ones of the taggants and the dispersive ink medium 170. Optionally, procedure 180 determines which of a plurality of dispersive media stored in medium file 156 is most compatible with the selected taggants. Program 180 determines the compatibility of the selected taggants with substrate 114. Program 180 selects sets of two or more differentiable taggants that are compatible with the dispersive medium 170 and substrate 114. The selected taggants in FIG. 1 are a set of three shown as taggants A, B and C, which are provided to an output device 159, such as a display or printer.

For the preparation of authenticatable mark 112, an operator obtains the selected taggants A, B and C and dispersive medium 170 as identified by output device 159. Taggant C is blended with dispersive medium 170 in blending apparatus 146 and provided via a single component blend path 172 to printing apparatus 148. Printing apparatus 148 prints the taggant C blend on substrate 114 as layer 118. Taggant B is then blended with dispersive medium 170 in blending apparatus 146 and provided via single component blend path 172 to printing apparatus 148. Printing apparatus 148 prints the taggant B blend on substrate 114 to overlie taggant C in whole or in part as layer 116. Taggant A is then blended with dispersive medium 170 in blending apparatus 146 and provided via single component blend path 172 to printing apparatus 148. Printing apparatus 148 prints the taggant A blend on substrate 114 to overlie taggant B in whole or in part as layer 115.

For the preparation of authenticatable mark 132, the above procedure is repeated for each of the taggants A, B, and C as needed for printing apparatus 148 to print a pattern in which taggants A, B and C are interspersed. It will be appreciated that the pattern shown in FIG. 1 is an example and other patterns are possible.

For the preparation of authenticatable mark 122, taggants A, B and C are blended in blending apparatus 146 with dispersive medium 170 and provided via a multi-blend path 174 to printing apparatus 148. Printing apparatus 148 prints the multi-component blend of taggants A, B and C on substrate 124.

Figure 2:
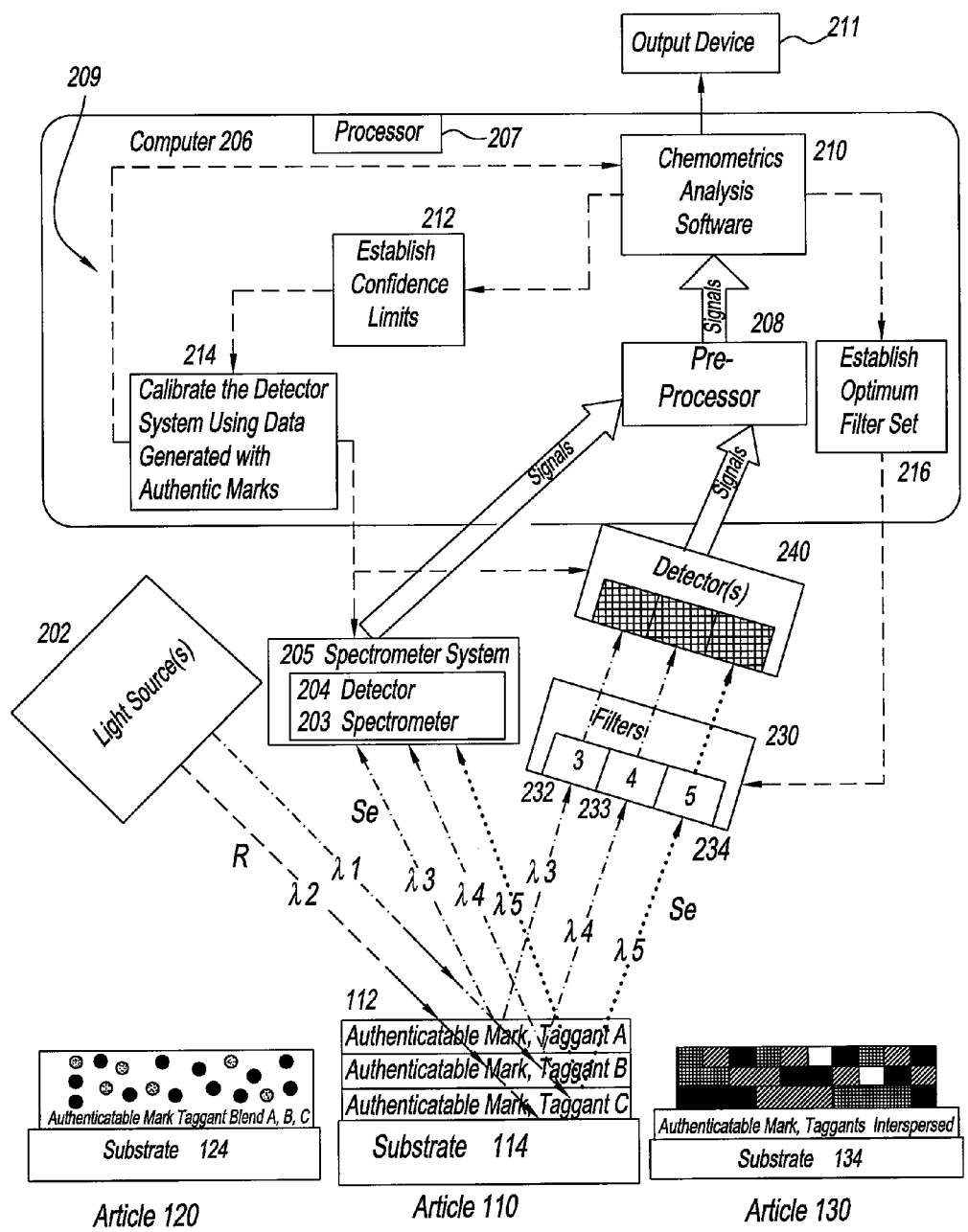
FIG. 2 is a block diagram of an authentication system of the present invention.

Referring to FIG. 2, an authentication system 200 of the present invention performs calibration (or training) and authentication operations. Authentication system 200 comprises one or more light sources 202, one or more detectors 204, a computer 206 and an output device 211. Output device 211 may be any suitable user interface device, e.g., a printer or display. Although three authenticatable articles 110, 120 and 130 are shown in FIG. 2, by way of example, authentication system 200 will be described as performing its operations on authenticatable article 110.

Referring again to FIG. 2, authenticatable article 110 is illuminated by light sources 202 with radiation R that activates the A, B and C of authenticatable article 110 as depicted at mark 112. Radiation R in one embodiment is provided by a single source with a bandwidth that activates taggants A, B and C of authenticatable article 110. In other embodiments, radiation R is provided by separate sources at the wavelengths of interest. That is, one, two, or more than two sources provide radiation at one, two and more than two wavelengths, which activate the taggants A, B, and C generating signals from the taggants with optionally different efficiencies over the same wavelength ranges. In FIG. 2, $\lambda 1$ and $\lambda 2$ are two of many possible excitation wavelengths, each of which can activate all the taggants.

Authenticatable article 110 emits a signal Se that spans a range of wavelengths depicted by $\lambda 3$, $\lambda 4$, $\lambda 5$ to $\lambda n$, corresponding to the wavelengths of the taggants A, B and C recorded in the memory of computer 144 in FIG. 1.

The spectrometer system 205, comprising a spectrometer 203 and detector 204, captures the signal Se and converts it to an electrical signal that is provided to pre-processor 208 of computer 206. The spectrometer 203 is a wavelength scanning device that is capable of separating the signals over a range of wavelengths, including $\lambda 3, \lambda 4, \lambda 5$. Detector 204 may suitably be, but is not limited to, a photomultiplier tube, a silicon PIN photodiode or an InGaAs PIN photodiode. In an alternate embodiment, spectrometer 203 can be replaced by filters 230 (FIG. 2). Filters 230 comprise, for example, narrow band filters 232, 233 and 234 tuned, in one embodiment, to wavelengths $\lambda 3, \lambda 4$ and $\lambda 5$, respectively, to provide narrow band or otherwise suitably delimited signals to detectors 240. Detectors 240 may be, but are not limited to, a photomultiplier tube, a silicon PIN photodiode or an InGaAs PIN photodiode. Filters 230 may also comprise combinations of short-pass or long pass wavelength cutoff filters or notch filters instead of or optionally combined with narrow band pass filters.

Computer 206 comprises a processor 207 that executes a program 209 that is stored in a memory (not shown). Program 209 comprises a pre-processor 208, analysis software 210, confidence limits software 212, a calibration software 214 and a filter optimizing software 216.

Computer 206 utilizes analysis software 210 that has capabilities for pre-processing detector signals 208, performing multivariate statistical analysis 210, establishing confidence limits 212, developing calibration procedures 214 and authenticating articles. Analysis software 210, for example, may suitably be multivariate statistical analysis software.

Pre-processor 208 converts the filtered signals Se provided by detector 204 (or detector 240) into a format suitable for evaluation by analysis software 210. Analysis software 210 preferably uses multivariate statistical analysis software (e.g., PLS toolbox available from Eigenvector Associates) to determine scores, loadings, number of factors and optimum discrete measurement region.

To calibrate (or train) the authentication system 200, each article in a series of authenticatable articles prepared by marking system 100 with different combinations of taggants is presented to spectrometer 205 and the signals recorded. When the last authenticatable article in the series has been measured, the signals are pre-processed by pre-processor 208 and analyzed with multivariate statistical analysis techniques by analysis software 210 (e.g., PCA) to characterize the signals of the training/calibration set of materials and define authenticatable marks in the series or set of authenticatable articles. Analysis software 210 also determines the goodness of fit statistics such as Q-residual, Hotelling's $T^2$, and Mahalanobis distance for each article, and the confidence limits for these, or other parameters.

Analysis software 210 and calibration software 214 train authentication system 200 (comprising the spectrometer system 205 and/or filters 230 and detectors 240) to recognize the authenticatable marks in the series. This procedure is described in more detail hereinafter.

Analysis software 210 compares the authentic marks of the series with counterfeit marks or simulated counterfeit marks, made similarly, but with different blends of the same or different materials. Analysis software 210 uses PCA analysis and confidence limits software 212 to determine whether the counterfeit marks fall within specified confidence limits. Marks that fall within the confidence limits are defined as true or genuine. Marks that fall outside confidence limits are defined as false or counterfeit. A counterfeit detection procedure is described in detail hereinafter. The result of the authenticity determination is notified to a user via output device 211.

Program 209 that runs on computer 206 selects the appropriate wavelengths to include in a discrete wavelength, filter based, reader and the method to train the reader to recognize counterfeit versus authentic labels. Program 209 relies primarily on PCA to reduce the signal Se provided by the authenticatable mark or a counterfeit mark from a full fluorescent spectrum (measured by spectrometer system 205) of the dyes or pigments comprising the mark into the appropriate filters that can be used in conjunction with detector 240 (FIG. 2).

Other multivariate statistical analysis techniques that can be used in this authentication scheme include, but are not limited to discriminate analysis, CLS, NAS, PLS and SIMCA. If multiple excitations and other physical effects like fluorescent lifetimes, step up fluorescence, X-ray signals or other physical properties are included then multi-way statistical tools may be used. These include, but are not limited to, TLD, PARAFAC, and MPCA.

When using filter based device 230, filters 232, 233 and 234 having the optimal wavelengths for the series of authenticatable marks must be selected. For a device using n filters, n–1 or fewer fluorescent pigments and/or dyes are selected from the materials used in the taggants that were developed for the series of authenticatable marks by marking system 100. This can be accomplished by performing a factorial experiment using single and/or mixed taggants in a series of marks.

The full spectra of all the samples used in the experiment are measured on an appropriate spectrometer system 140 (FIG. 1) and 205 (FIG. 2). The spectral signals are preprocessed prior to performing PCA by normalizing each spectrum to unit area followed by mean centering. Normalization to unit area may be used to compensate for signal variation due to distance of the sample from the detector. Analysis software 210 then performs a PCA analysis of the full spectra of the data, computing scores, loadings and eigenvalues and various statistics for each sample and the corresponding statistical limits for evaluating the calibration.

Analysis software 210 and filter optimizing software 216 select filters 232, 233 and 234 based on the PCA loadings maxima and/or minima. The number of filters is at least one more than the number of components required to develop adequate differentiation between authentic and counterfeit samples via various statistical parameters (e.g., Q-residual, etc.).

The filter based portion of authentication system 200 is trained by measuring discrete (or filter based) spectra for the same set of samples. Analysis software 210 preprocesses the data by normalizing the filter signals captured for each mark to unit area followed by mean centering the data set and by using PCA analysis of discrete filtered data to compute eigenvalues, loadings and scores. Confidence limits software 212 uses these statistics to calculate appropriate statistical limits for the marks, which in the preferred embodiment are either a Q-residual limit a Mahalanobis limit or a Hotelling's $T^2$ limit as defined below. PCA loadings, eigenvalues, and required statistical limits are entered into authentication system 200 for use in authenticating target or unknown marks. Authentication system 200 is now trained and ready to authenticate security marks.

Authenticity of unknown marks is determined by measuring and analyzing the unknown mark using the trained authentication system 200. The input signals Se are preprocessed in the same manner as performed in the calibration of the device 200. The filtered signals Se are normalized to unit signal intensity, followed by mean centering using the mean spectrum generated from the calibration data. Computer 206 calculates the appropriate statistics for the unknown mark and compares them to the stored statistical limits for authentication.

By way of example the Mahalanobis distance ($D^2$) is calculated based on the following formula:

$$D^2 = x(X^T X/(m-1))^{-1} x^T \quad (1)$$

In equation (1), x is the mean centered spectrum of the unknown mark, m is the number of spectra used in the calibration, and $((X^T X/(m-1))^{-1}$ is the inverse covariance matrix of the training set stored in the device. Superscript T represents the matrix transpose operator. The Mahalanobis distance can be compared to the corresponding limit, which is stored in the device and used to determine sample authenticity. The Mahalanobis distance limit is calculated from the following equation:

$$D^2_{n,m,\alpha} = n(m-1)/(m-n) F_{n,m-n,\alpha}, \quad (2)$$

where $D^2_{n,m,\alpha}$ is the statistical limit, n is the number of filters, m is the number of samples in the training set and F is taken from F-distribution tables for the $(1-\alpha)$ percentile.

Other statistical parameters may be used for determining authenticity based on the training set of samples. The Q-residual statistic is calculated using the calibration model based on the following formula:

$$Q = x(I - P_k P_k^T) x^T, \quad (3)$$

where Q is the calculated residual value, x is the mean centered spectrum for the unknown mark, I is the (n×n) identity matrix, and $P_k$ is the (k×n) loadings matrix retained in a calibration model for the training data (see 214 in FIG. 2). Superscript T represents the matrix transpose operator. This (n×n) matrix is stored in computer 206.

The statistical Q limit ($Q_{lim}$) stored in computer 206 is calculated from the following:

$$Q_{lim} = \Theta_1 [c_\alpha (2\Theta_2 h_0^2)^{1/2}/\Theta_1 + 1 + \Theta_2 h_0 (h_0 - 1)/\Theta_1^2]^{1/h_0}, \quad (4)$$

where $$\Theta_i = \Sigma \lambda_j^i; \text{ for } i=1, 2, 3; \text{ for } j=k+1 \text{ to } n, \quad (5)$$

$\lambda_j$ represents the model eigenvalues, and $$h_0 = 1 - 2\Theta_1 \Theta_3 / 3\Theta_2^2. \quad (6)$$

In equation 4, $c_\alpha$ is the standard normal deviate corresponding to the $(1-\alpha)$ percentile. In equation 5, k is the number of principal components used to calculate the Q-residual values (i.e. the number of principal components in the model).

The Hotelling's $T^2$ statistic and the corresponding limit are calculated by equations and (7) and (8) respectively:

$$T^2 = x P_k \lambda^{-1} P_k^T x^T \quad (7)$$

$$T^2_{k,m,\alpha} = [k(m-1)/(m-k)] F_{k,m-k,\alpha}, \quad (8)$$

where x, $P_k$, superscript T, m, k and a were defined above and F is taken from statistical distribution tables.

Authentication of a specific mark is determined by comparing the sample statistic with the corresponding statistical limit. For example, if the Mahalanobis distance is greater than the Mahalanobis distance limit, the target security marker is deemed a counterfeit. If the Mahalanobis distance is less than or equal to the Mahalanobis distance limit, it is deemed authentic. Alternatively, if Q-residual is greater than the Q-residual limit, the target security marker is deemed a counterfeit. If $T^2$ is greater than the $T^2$ limit, the target security marker is deemed a counterfeit. If the Q-residual distance is less than or equal to the Q-residual distance limit, the target security marker is deemed valid or authentic. When using Q-residual and $T^2$, the sample is deemed authentic only when both conditions apply (i.e. Q-residual is less than or equal to the Q-residual limit and $T^2$ is less than or equal to the $T^2$ limit).

Examples of using the marking system 100 and authentication system 200 of the present invention are set forth below. A typical multi-taggant system comprises three taggants comprised of salicylic acid and anthranilic acid derivatives, selected from Lumilux® CD materials 301, 310, 318, 320, 328, 329, 382, 394, 401, 418, 710, 728, and 729.

Example (1)

Six taggant materials as defined above in fine powder form were used to prepare ink samples in a clear offset ink. The materials each have little or no body color, are activated by long-wavelength ultraviolet light, and upon activation emit visible fluorescent light at different visible wavelengths, measurable by a spectrofluorimeter or similar detection device, affording different fluorescent colors as observed by the unaided human eye, and characterizable as well by determination of the color index coordinates, such as CIE or L*a*b. Inks were formulated with each of the materials separately by incorporating with shearing by spatula 2% by weight of each powder into the clear ink. The inks prepared in this manner were essentially clear to pale yellow, and exhibited minimal observable natural color in the printed form. Additional inks were also prepared with 1:1 mixtures of the fluorescent materials.

The formulated inks were then applied with an offset lab printer in a series of offset prints, with each fluorescent color material printed both separately in individual prints, and combined with selected other inks from the prepared set, in multiple layers on top of each other, onto white card stock substrates having little unintended fluorescent emission. Prints made with two sets of two materials each were designated as "authentic," and one set of prints with two additional materials was designated as "counterfeit." Pair-wise print overlays were made of each combination of the paired "authentic" and "counterfeit" inks, as well as prints of inks comprised of 1:1 mixtures of the fluorescent material pairs. The material pairs were selected to have net emission colors similar to those of the other "authentic" and "counterfeit" pairs.

Sets of the prints were then divided into subsets for accelerated environmental challenge testing with UV light, moisture and heat. The full set of resultant control and aged "authentic" and "counterfeit" prints were then tested by excitation through a fiber-optic channel with a 365 nm UV light emitting diode, and measurement of wavelength dependent fluorescent emission intensity using an attached spectrometer. The spectra were converted to electronic intensity values at specified wavelength intervals, and these data were subjected to analysis using multivariate statistical techniques, including determination of loading factors, Q-residual and Mahalanobis distances.

The "authentic" data sets were used to prepare a training set against which the other "authentic" set and "counterfeit" set could be measured. The "authentic" data remained within Q-residual and Mahalanobis distance limits as defined by the training sets, and all three sets of printed combinations could be readily distinguished from each other, including data from the artificially aged prints, which exhibited vectors in the parameter space indicative of the environmentally induced changes, but remaining distinct among the several "authentic" and "counterfeit" data sets. See FIGS. 3 and 4.

A principal components model was built from the full spectra of one of the two "authentic" data sets. This model generated the number of discrete wavelengths to use (4) and the spectral loadings that indicate which wavelengths to use: 430, 482, 523, and 538 nm.

Figure 3:
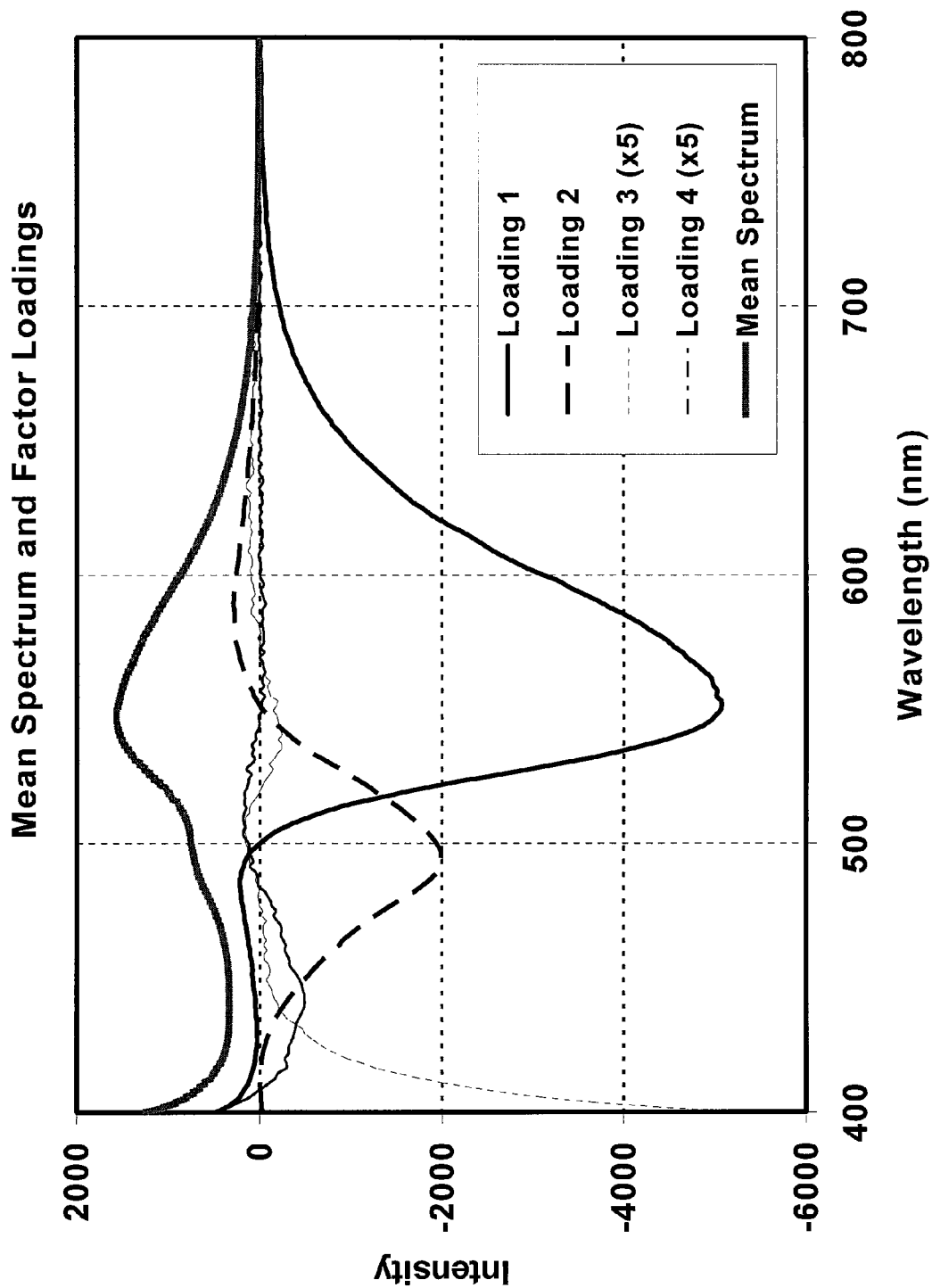
FIG. 3 is a plot of loadings spectra overlaid with mean spectrum for example (1)

FIG. 3 shows the first two loadings are the major contributors to the model. Filter wavelengths were selected that corresponded to the maximum and minimum value for each loading. The discrete data for the 4 wavelengths was assembled and reanalyzed by the principal components method, generating the eigenvalues, loadings, sample statistics (M-distance, Q-residual) and corresponding statistical limits. This discrete model can now be used to analyze other sample sets.

Figure 4:
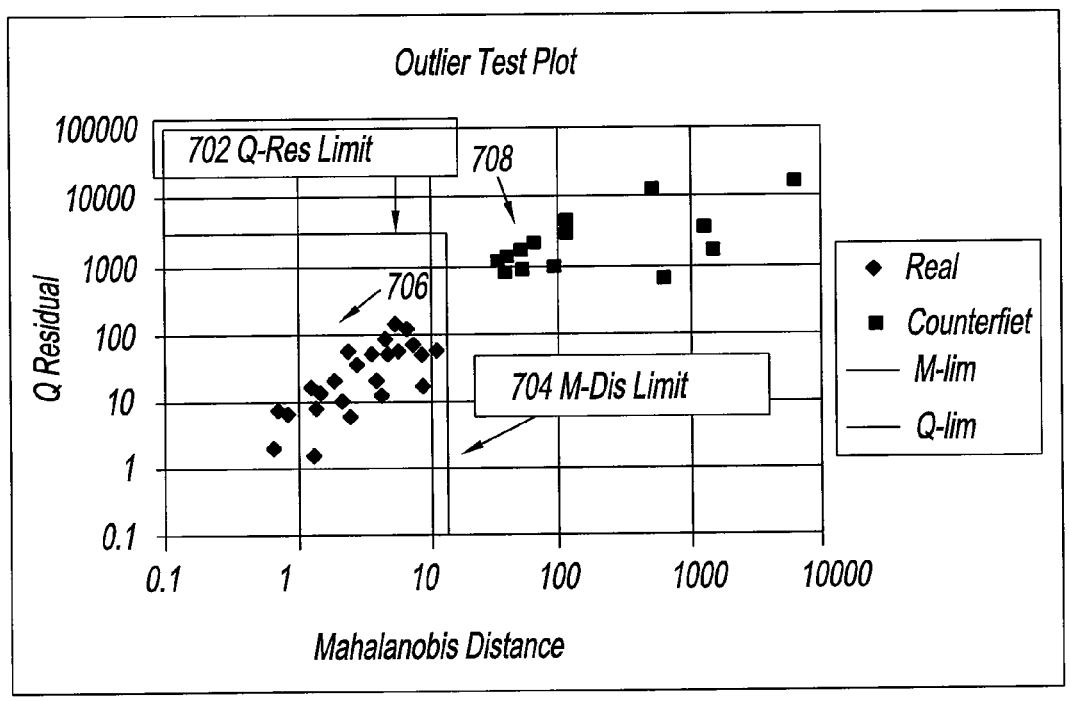
FIG. 4 is an outlier plot for example (1)

FIG. 4 shows the outlier limit Q-Res 702 and M-Dis limit 704 around the "authentic" samples (diamonds 706) with the "counterfeit" samples (squares 706) all lying outside the limits.

This data set shows the differentiation obtained by this method between weathered mixtures of different emissive materials using 4 wavelengths. A device with memory for simple matrices derived from multivariate statistical analysis and a few constants is now all that is required to compute simple values that will trigger the "authentic" or "counterfeit" signal.

Example (2)

Figure 5:
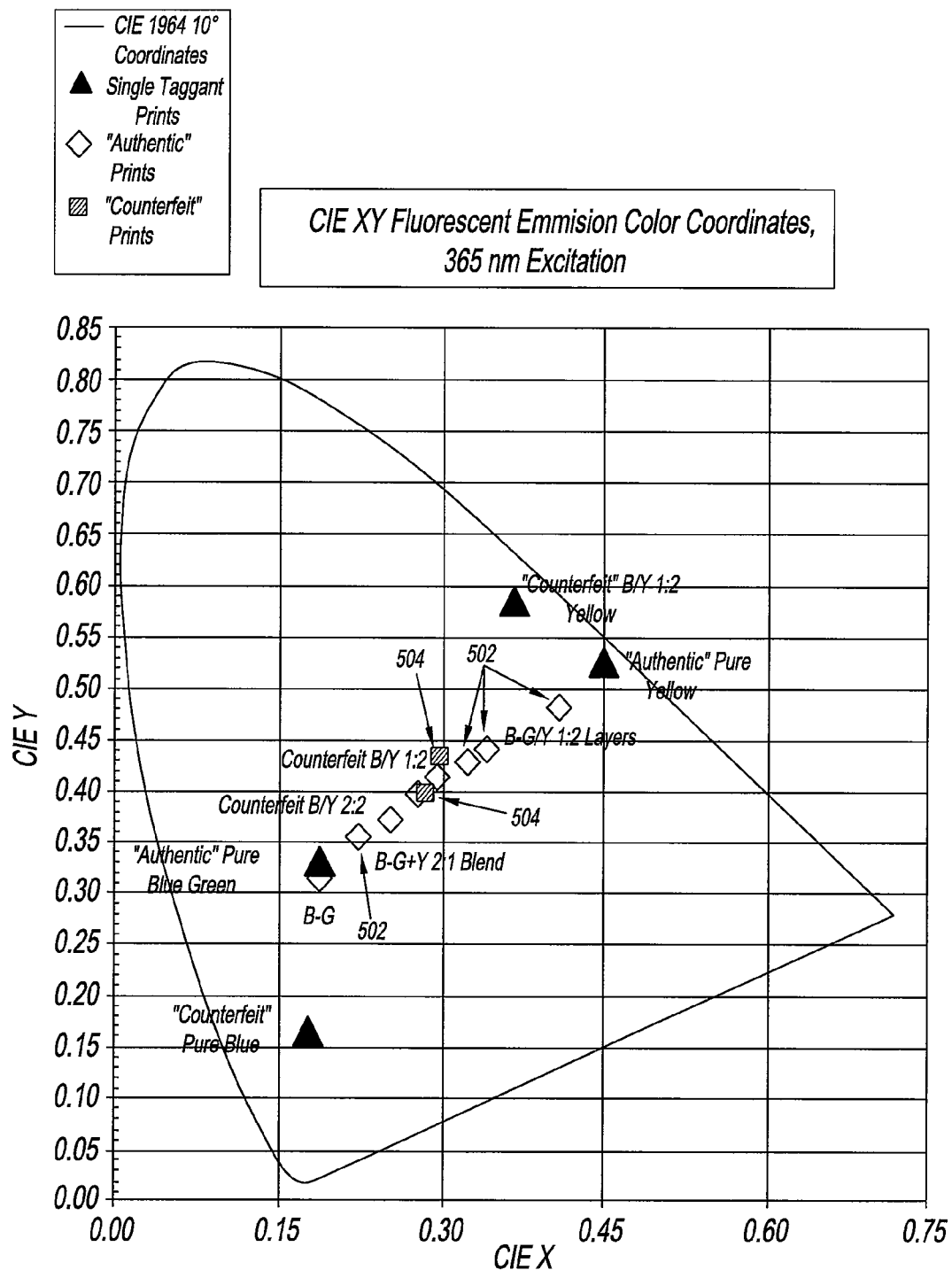
FIG. 5 is a CIE diagram for example (2)

A set of prints using a pair of the "authentic" materials from Example (1) was made, with inks prepared as before, but at both 1% and 2% by weight, with prints of each individual ink, and a set of overlays using one to two layers each of the several concentrations of each ink over or under each other, resulting in long wavelength UV excited fluorescent emissions ranging across the CIE color space from near that of the first material to near that of the second material. See diamond shaped symbols 502 in FIG. 5. Another more limited set of prints designated arbitrarily as "counterfeit" was made using inks made with other materials from Example (1), formulated and laid down in an overlay fashion to generate an emitted fluorescence with CIE color coordinates closely matching those observed in and/or calculated for an arbitrarily targeted region of the "authentic" set. See square shaped symbols 504 in FIG. 5.

Figure 6:
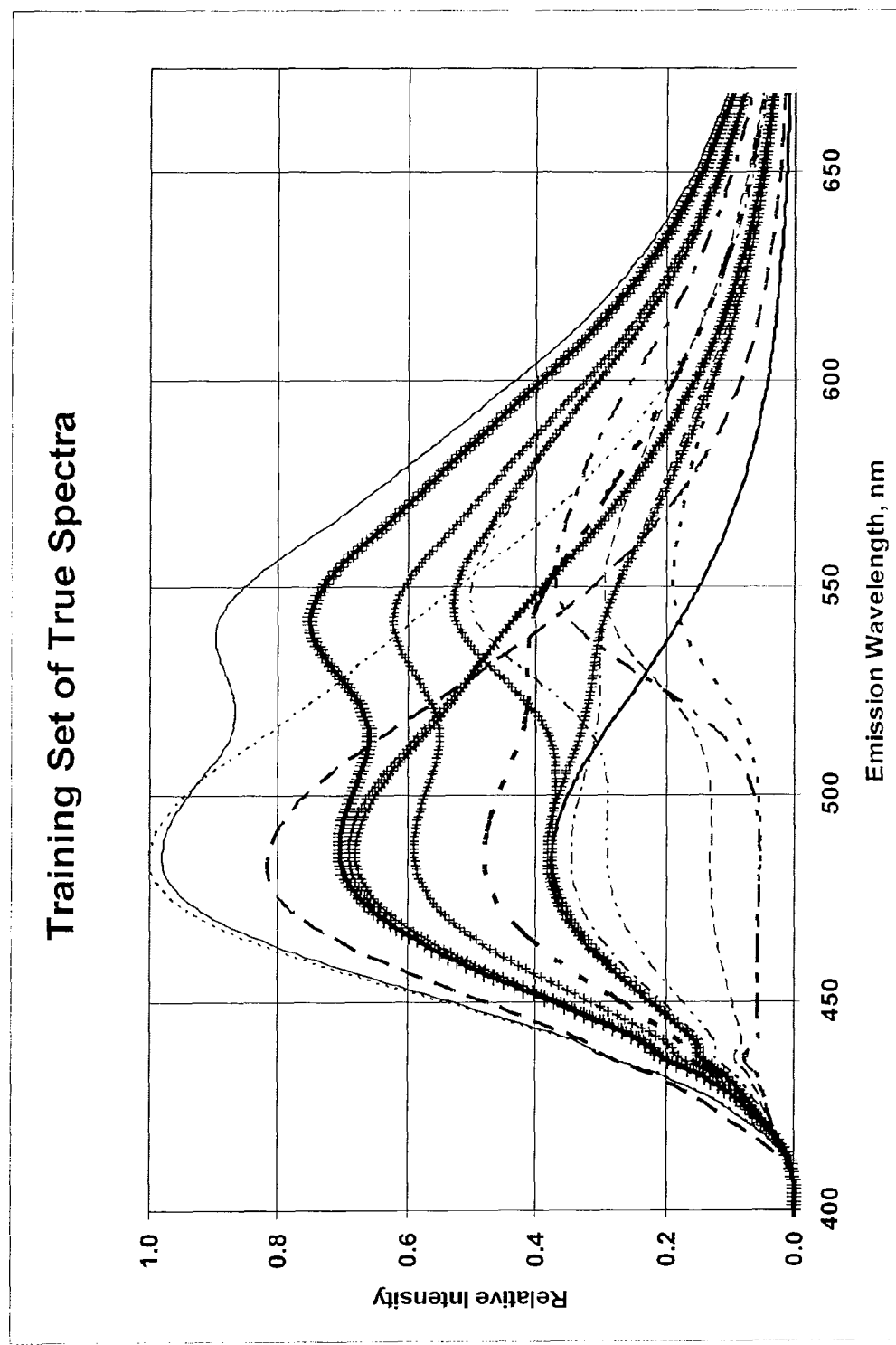
FIG. 6 is a plot of a training set of true spectra for example (2)
Figure 7:
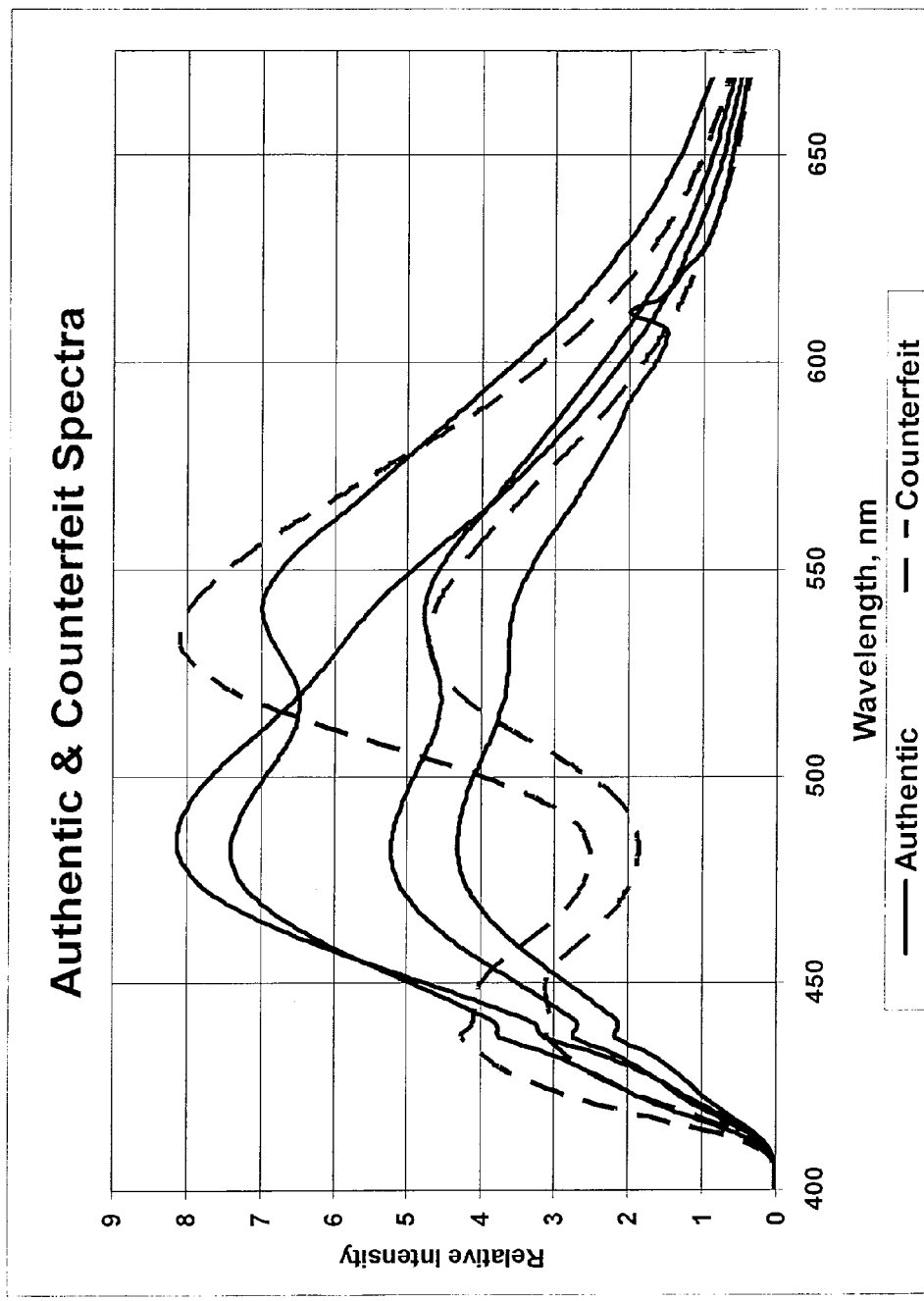
FIG. 7 is a plot of a test set of challenge spectra for example (2)
Figure 8:
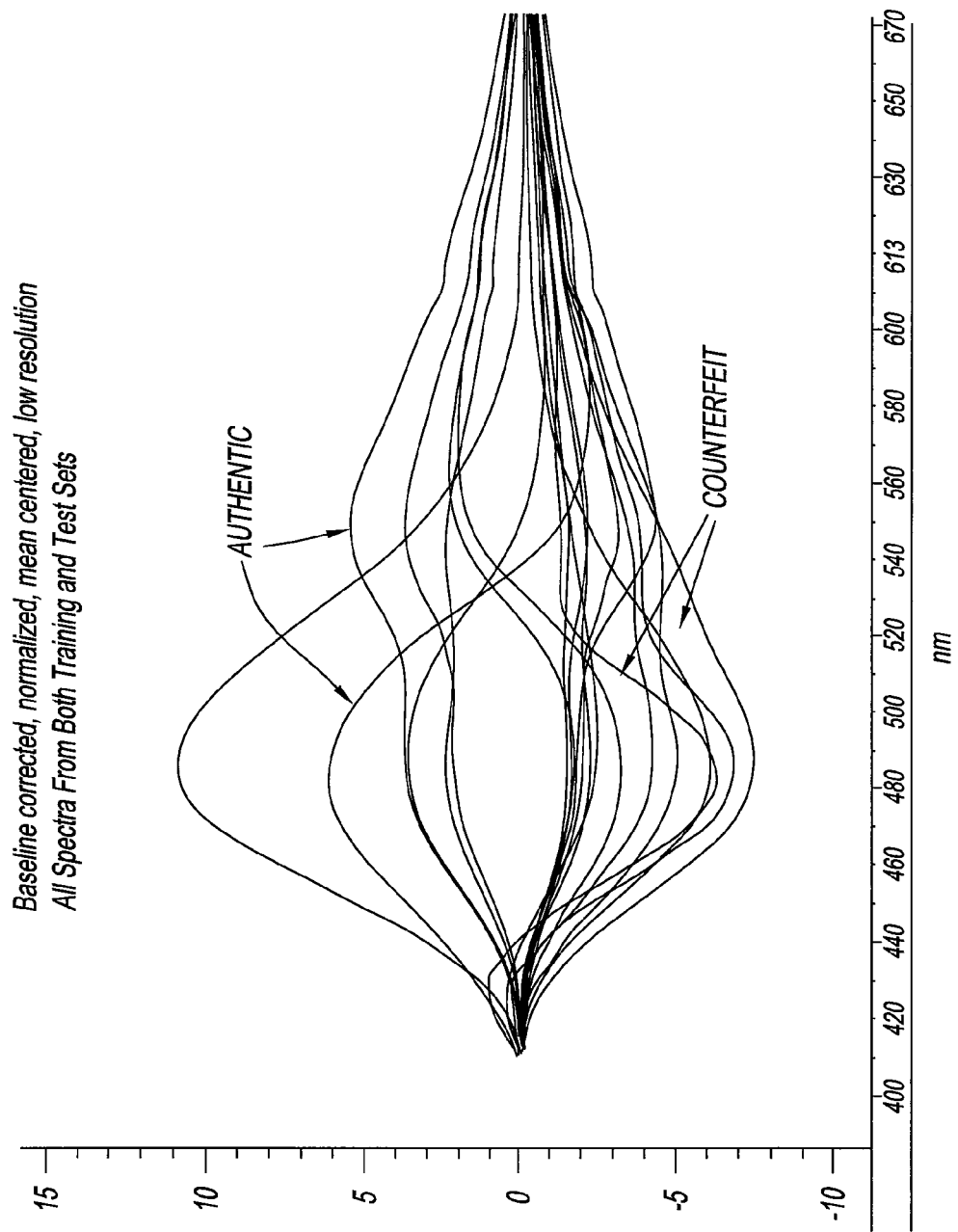
FIG. 8 is a baseline corrected plot of the spectra of FIGS. 6 and 7

The spectra of the samples were measured using a detector as described in Example (1); the fluorescent intensities and CIE coordinates of the "counterfeit" samples were recorded and compared with those of the "authentic" prints described above. The color coordinates and visual appearance of the samples' fluorescence to the unaided human eye were effectively undistinguishable. The raw spectra of the "authentic" and "counterfeit" samples are shown in FIGS. 6 and 7, and baseline-corrected, normalized spectra in FIG. 8.

Figure 9:
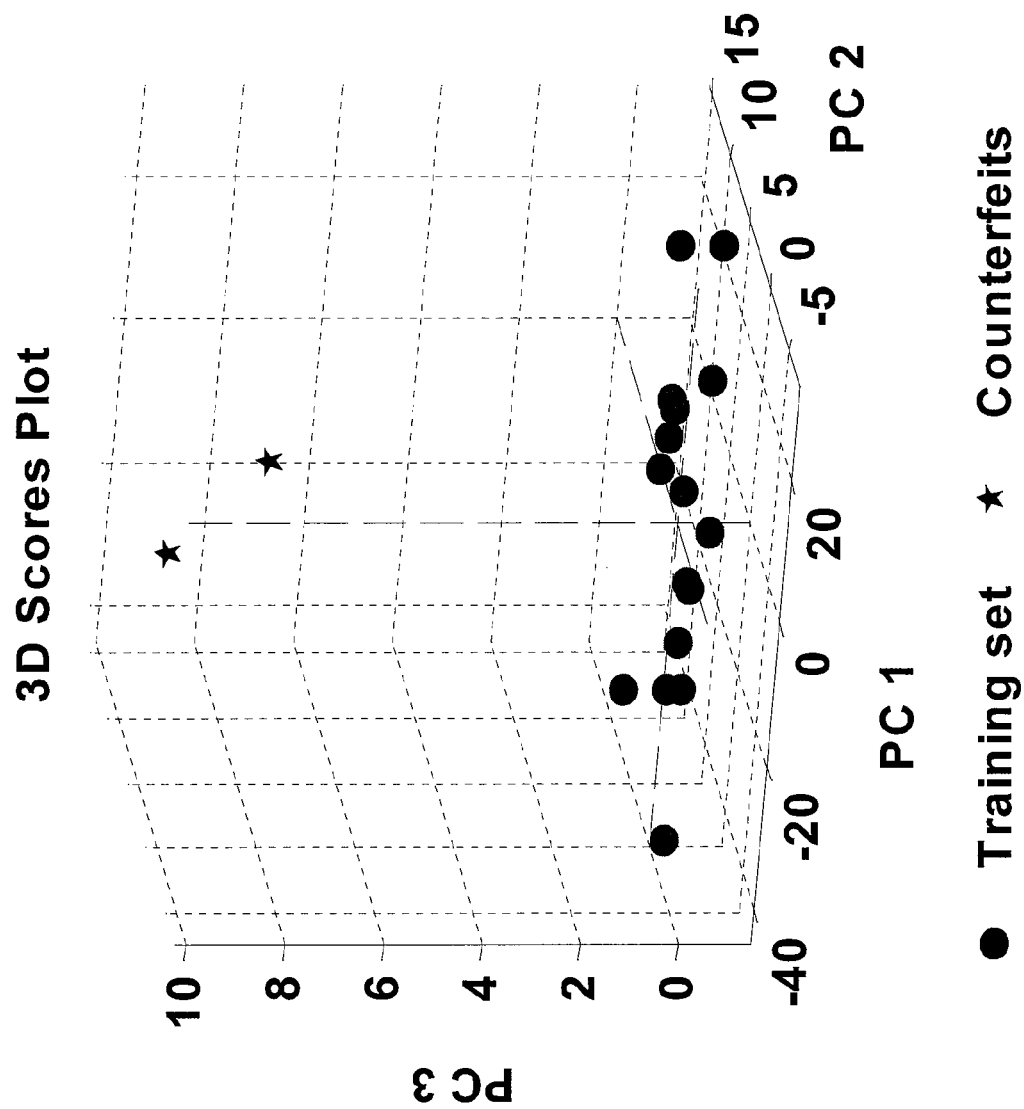
FIG. 9 is a plot of three-dimensional scores for example (2)

Employing PCA techniques, the scores corresponding to the various principal components for the corrected spectra for each of the prints were calculated, and are plotted in three dimensions (PC1, PC2, and PC3) in FIG. 9. The data points 1402 and 1404 in FIG. 9 with large Z-axis values represent the designated "counterfeit" prints. The sample statistics plot shown in FIG. 10 indicates that the authentic points all fall below the Q-residual limit defined by the PCA model and the counterfeit points all fall above the Q-residual limit.

Figure 10:
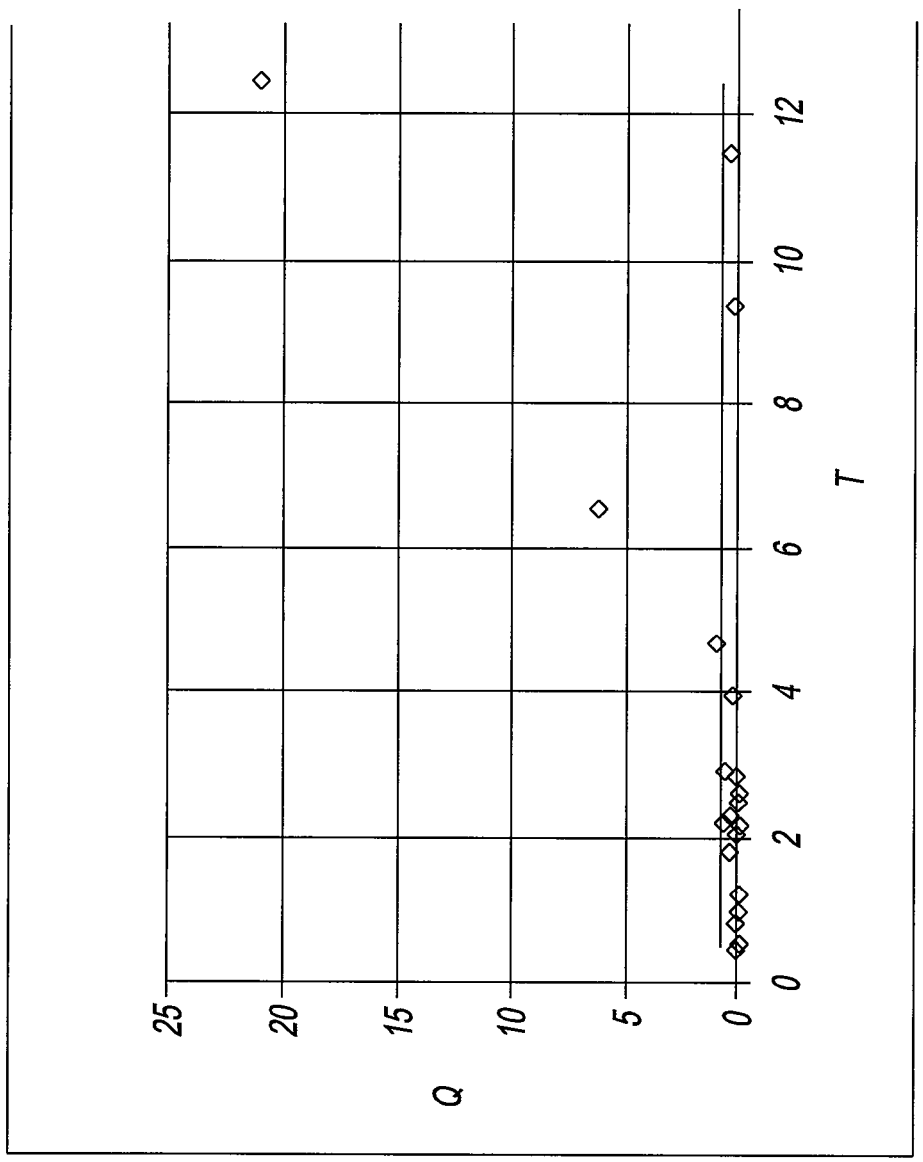
FIG. 10 is a plot of Q-residual versus Hotelling's $T^2$ for example (2)

Referring to FIG. 10, a plot of Q-residuals and Hotelling's $T^2$ statistics and the corresponding limits is useful for detection of outliers or counterfeits. These statistical parameters are given by equations (3) and (3a). These statistics describe how well any data point fits the calibration model. Using FIG. 9 as an example the authentic samples are confined to an area on a plane in three dimensions. The Q-residual describes how far any sample is above or below this plane. When the Q-residual is greater than the Q-residual limit, the sample is an outlier (i.e. does not fit the calibration model) and is designated as a counterfeit. This indicates taggant(s) different to the authentic sample are being mixed together. When $T^2$ for a sample is greater than the $T^2$ limit, the sample is also an outlier (i.e. does not fit the calibration model) and is designated as a counterfeit. This indicates the counterfeit corresponds to a mixture of the same taggants used in the authentic set, but have relative amounts in the mixture that are different to the training set.

Example (3)

Figure 11:
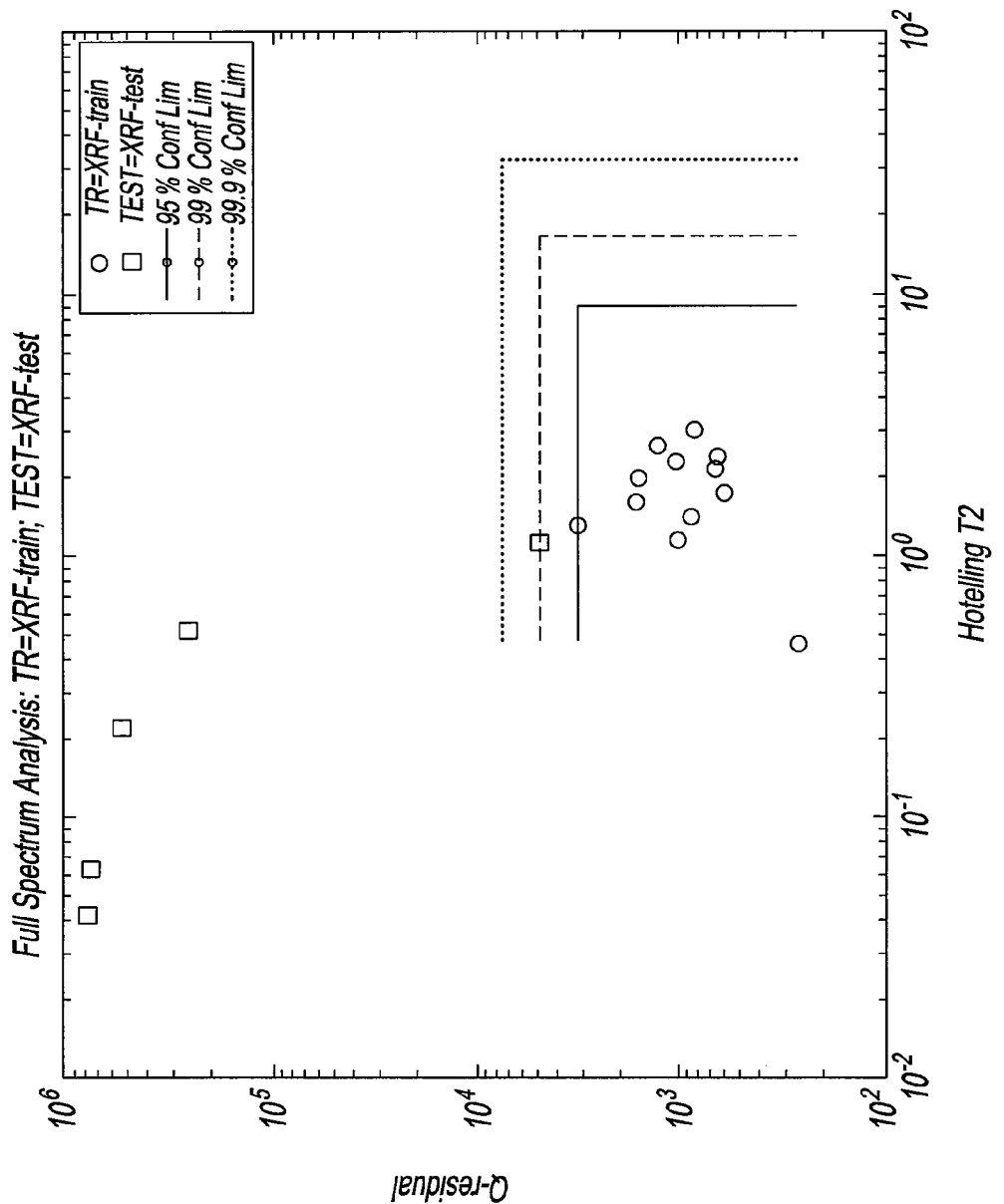
FIG. 11 is a plot of Q-residual versus Hotelling's $T^2$ for example (3)

A series of 12 samples were coated on thin films with rare earth materials having known X-ray fluorescence emissions. These samples, which contained variable amounts of Eu, Tb and Gd containing compounds, were treated as "authentic" and used to train a device that is based on X-ray fluorescence. Four additional samples were prepared in the same way, except they contained compounds possessing another X-ray fluorescent element in addition to Eu, Tb, and Gd. These are regarded as "counterfeit" samples. The latter samples comprised a test set for the purposes of demonstrating this application to X-ray fluorescence. A sample containing Tb and Eu based compounds (i.e. an "authentic sample") was added to the test set. The X-ray fluorescence spectrum for each sample was measured at appropriate wavelengths. PCA of the X-ray fluorescence of the authentic set was used to set limits for Q-residual and Hotelling's $T^2$. The PCA model was evaluated using the test samples. FIG. 11 shows a plot of Q-residual vs. $T^2$ and the statistical limits. The four samples containing additional rare earth elements are recognized as counterfeits. The remaining test sample is recognized as authentic (within the 99.9% limit). This example demonstrates the ability to distinguish between authentic and counterfeit materials using a different technique, viz. X-ray fluorescence.

Example (4)

A series of UV excitable materials with differing visible fluorescent emission maxima was identified as suitable for preparation of a set of blends which may be readily distinguished by the techniques of the present invention. Blends of materials with fluorescent emissions having similar or identical CIE coordinates is one example of how to identify blends suitable for this process. Blend sets of three of these materials were prepared in a clear offset ink, and prints were made of the pure component inks and ink blends. The prints containing the active taggant blends were excited using an UV lab lamp set at 365 nm, and spectra were taken of the fluorescent emissions using a laboratory spectrometer. Initially, the full spectra of the pure component tagged inks were transmitted to a computing system, where a series of simulated blend compositions and their emission spectra were calculated, and these spectra were evaluated using a multivariate statistical analysis software system to determine PCA scores, loadings and eigenvalues. From the loadings maxima, an optimum set of filters was selected, at least one more filter than the number of taggants, to be used to delimit the fluorescent emission spectra to a discrete number of signals measured as the response of a detector to the emission transmitted through each individual filter. Simulated filters were then superimposed on the simulated and actual full spectra of the blends, to obtain simulated discrete spectra.

Figure 12:
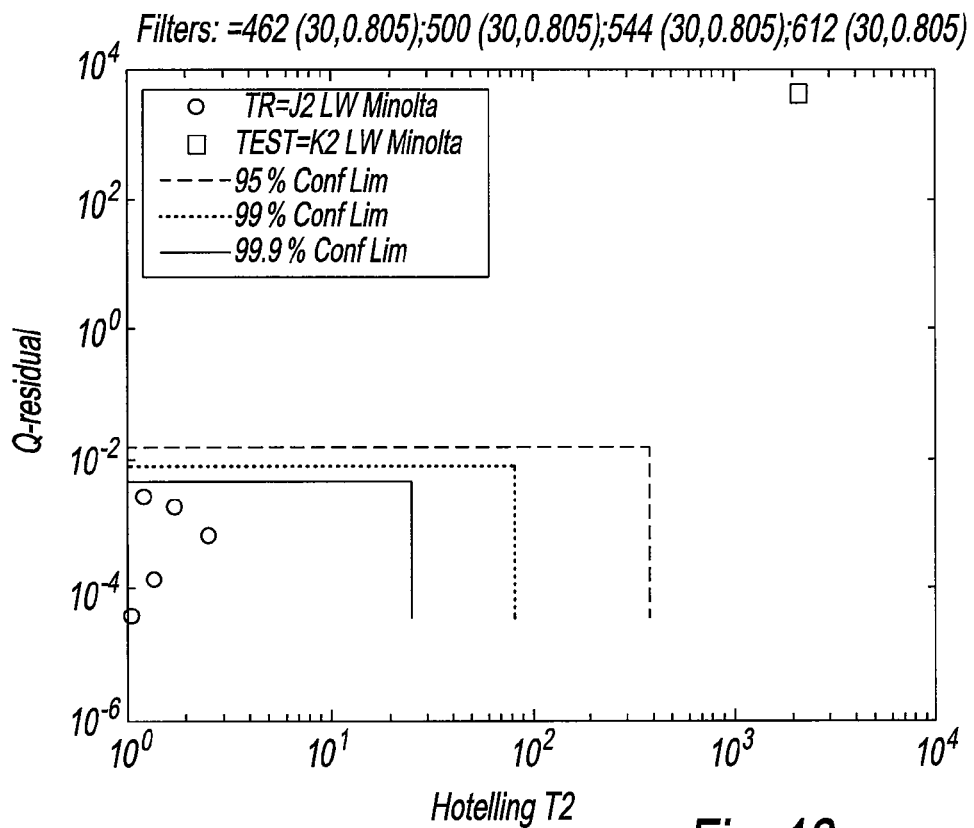
FIG. 12 is a plot of Q-residual versus Hotelling's $T^2$ for example (4)

These spectra were submitted to full PCA analysis to determine Q-residual and Hotelling's $T^2$ values for each blend, and from appropriate sets of blends, 95%, 99% and 99.9% confidence limits for these parameter were determined. It was verified that the simulated blend spectra could readily be distinguished from alternative blend spectra simulated from pure print values of alternative taggant materials. A set of four band-pass filters meeting the previously determined cutoff criteria was obtained and deployed severally to intercept light signal transmissions to four photo-receptor diodes in a detection device equipped also with a 365 nm UV light emitting diode. The prints made with blends of "authentic" and designated "counterfeit" materials were then subjected to interrogation by the authentication device, the discrete outputs were evaluated using the previously described multivariate statistical analysis software systems, and the "authentic" sets were found to be distinguishable from the "challenge" sets far beyond the 99.9% confidence limits as depicted in FIG. 12.

Example (5)

A series of UV excitable materials with differing visible fluorescent emission maxima was identified as suitable for preparation of a set of blends which may be readily distinguished by the techniques of this invention. Blends of materials with fluorescent emissions having similar or identical CIE coordinates is one example of how to identify blends suitable for this process. Blend sets of three of these materials were prepared in a clear offset ink, and prints were made of the pure component inks and ink blends. The prints containing the active taggant blends were excited using a UV lab lamp set sequentially at 365 nm, 302 nm and 254 nm, and spectra were taken of the fluorescent emissions using a laboratory spectrometer. The full spectra of the pure component tagged inks were transmitted to a computing system, where a series of simulated blend compositions and their emission spectra were calculated, and these spectra were evaluated using multivariate statistical analysis software systems to determine PCA scores, loadings and eigenvalues.

Figure 13:
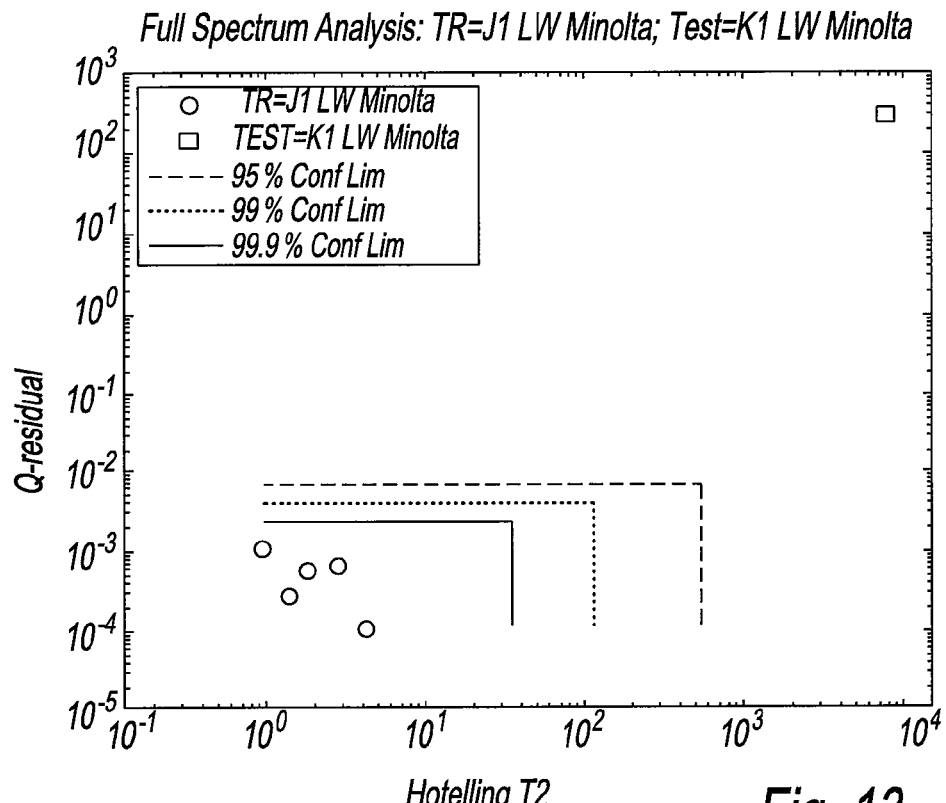
FIGS. 13 and 14 are plots of Q-residual versus Hotelling's $T^2$ for example (5)
Figure 14:
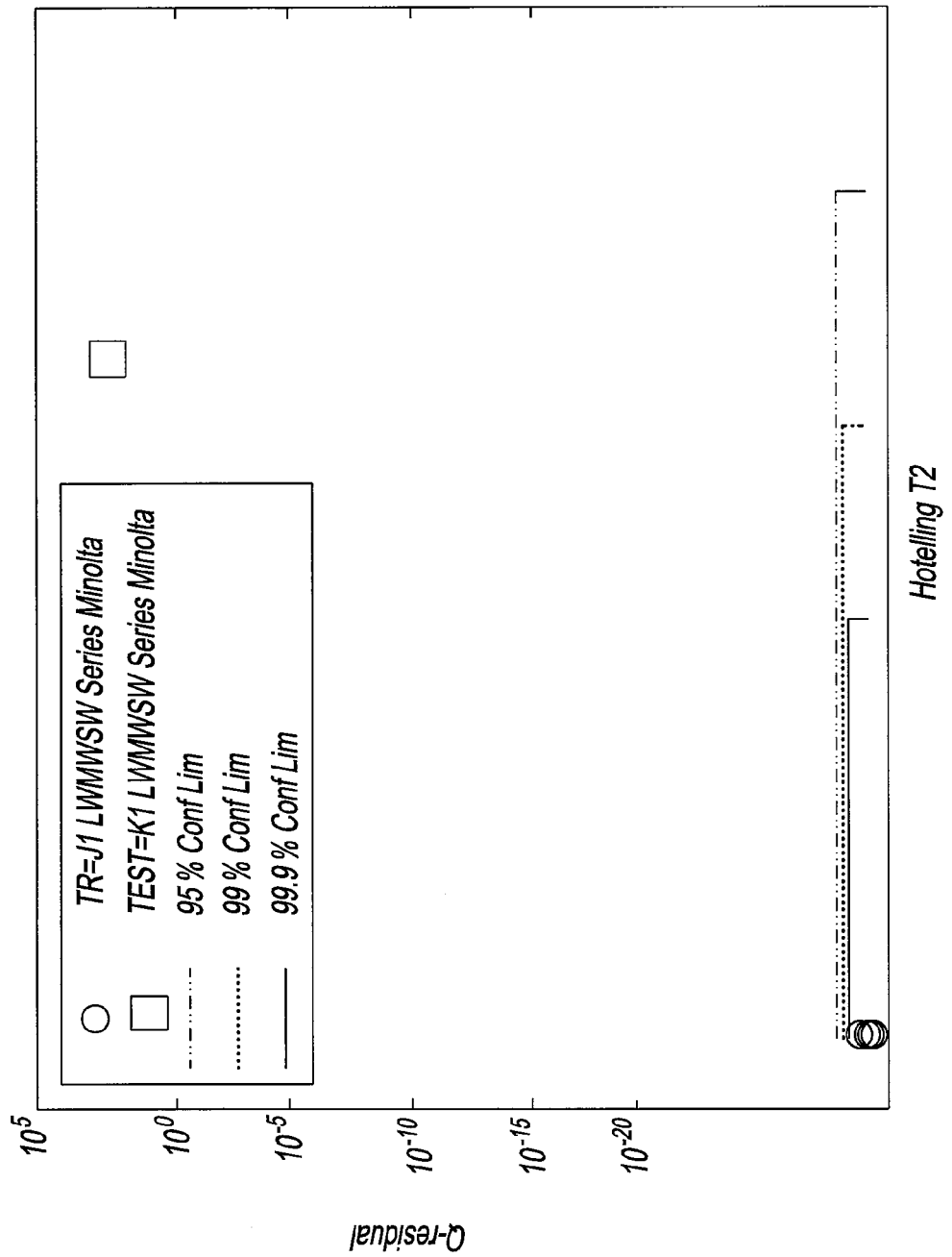

The separate different wavelength activated spectra were submitted to full PCA analysis to determine Q-residual and Hotelling's $T^2$ values for each blend, and from appropriate sets of blends, 95%, 99% and 99.9% confidence limits for these parameters were determined. It was verified that the simulated blend spectra could be distinguished from alternative blend spectra simulated from pure print values of alternative taggant materials, with 95% figures of merit (defined as the ratio of the parameter value to the 95% confidence limit) on the order of 100,000. Further multivariate statistical analysis evaluation of the combined blend sets activated at all three wavelengths showed an improvement in figure of merit discrimination between "authentic" and "counterfeit" blends of many orders of magnitude. FIGS. 13 and 14 show plots of Q-residual and Hotelling's $T^2$ for the samples.

Example (6)

Figure 15:
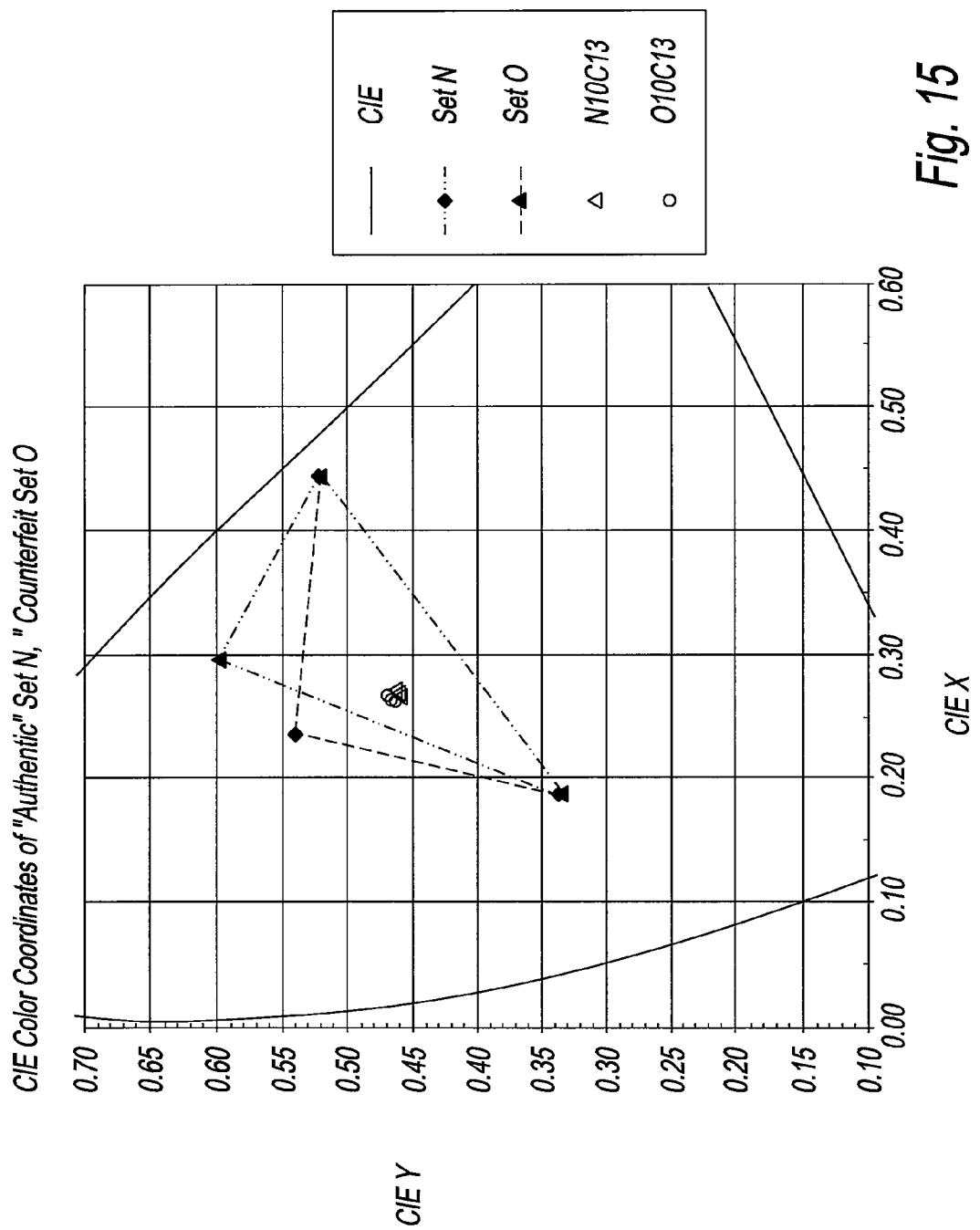
FIG. 15 is a CIE diagram for example (6)

A set of prints was made from ink blends prepared in a fashion similar to that described in Example 5, using a different series of three UV excitable materials. A CIE color space plot of the blends is shown in FIG. 15. The prints containing the active taggant blends were excited using an UV lab lamp set at 365 nm, and spectra were taken of the fluorescent emissions using a laboratory spectrometer.

Figure 16:
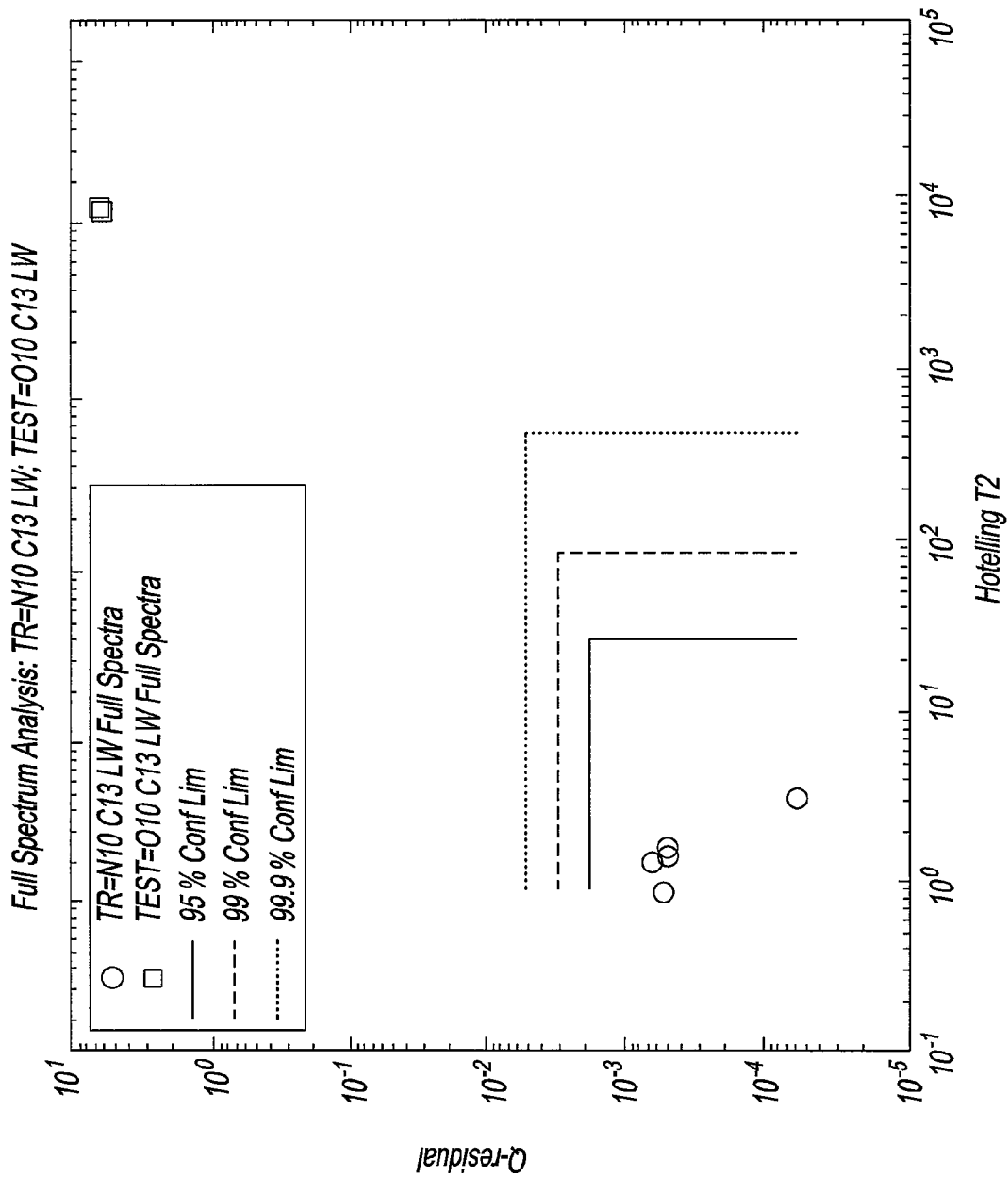
FIGS. 16 and 17 are plots of Q-residual versus Hotelling's $T^2$ for example (6)

A PCA model was built from the full spectra of the "authentic" data set. A graphic depiction of the Q-residual/$T^2$ analysis of the full spectrum model data is shown in FIG. 16; the test prints fall well outside the 99.9% confidence limit, verifying the ability to use full spectrum data to distinguish between "authentic" and "counterfeit" samples.

The full spectrum model was used to generate the number of discrete wavelengths to use (4) and optimal filter wavelengths (460, 500, 530, and 580 nm), based on the spectral loadings. A detector assembly was prepared, containing a 365 nm excitation light emitting diode, four filters with wavelengths determined above, modifying the light emitted from the excited sample and impinging on the photo-receptor diodes within.

Figure 17:
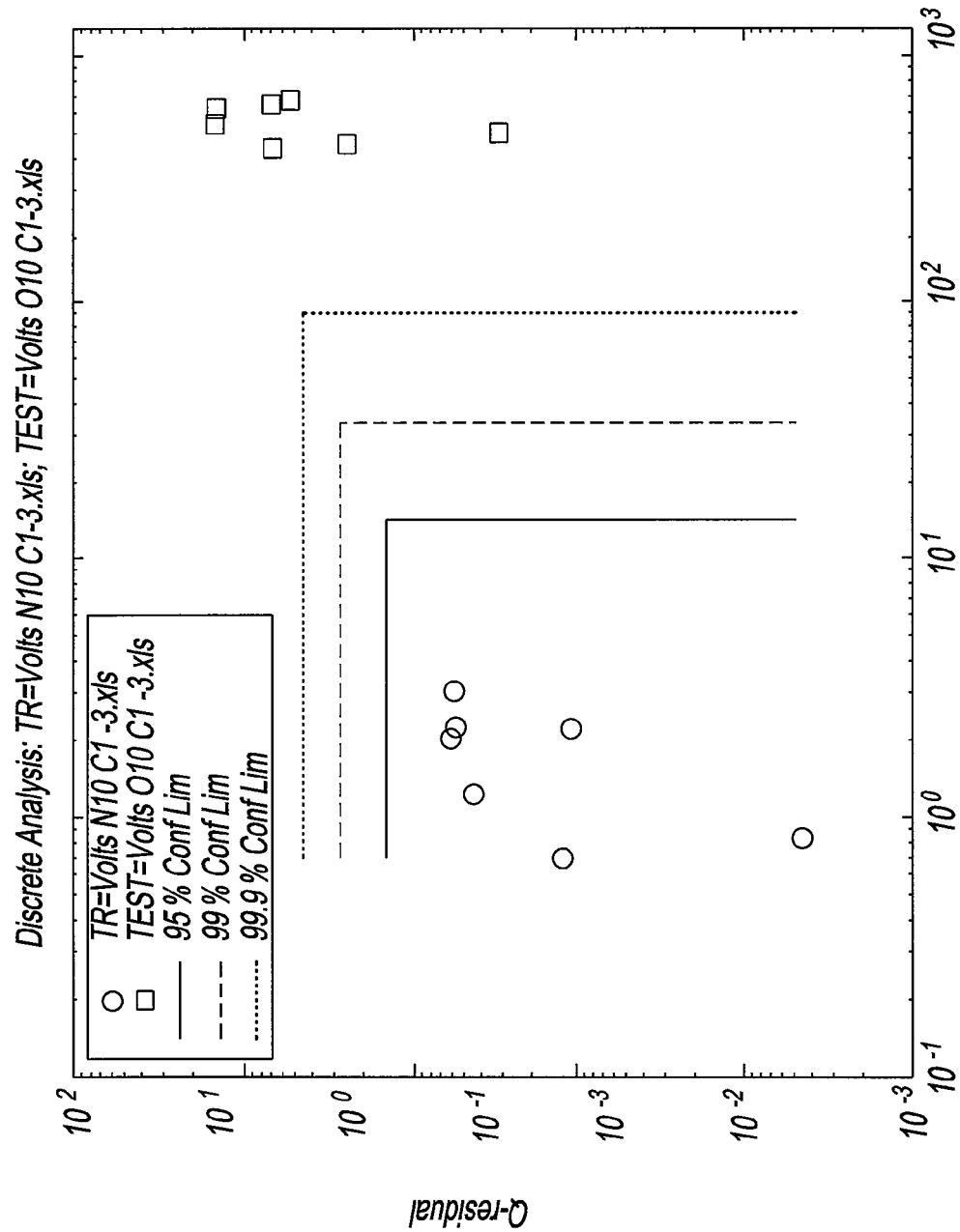

Voltages representing the light intensity in each of the four filtered detector channels were recorded, and the data were compiled into a format addressable by the multivariate statistical analysis software, including normalization of the data to 100% for the sum of the signals. A graphic depiction of the Q-residual/$T^2$ analysis of the discrete voltage data is shown in FIG. 17; the test prints fall outside the 99.9% confidence limit, showing the ability to use filter delimited discrete data to distinguish between "authentic" and "counterfeit" samples.

Figure 18:
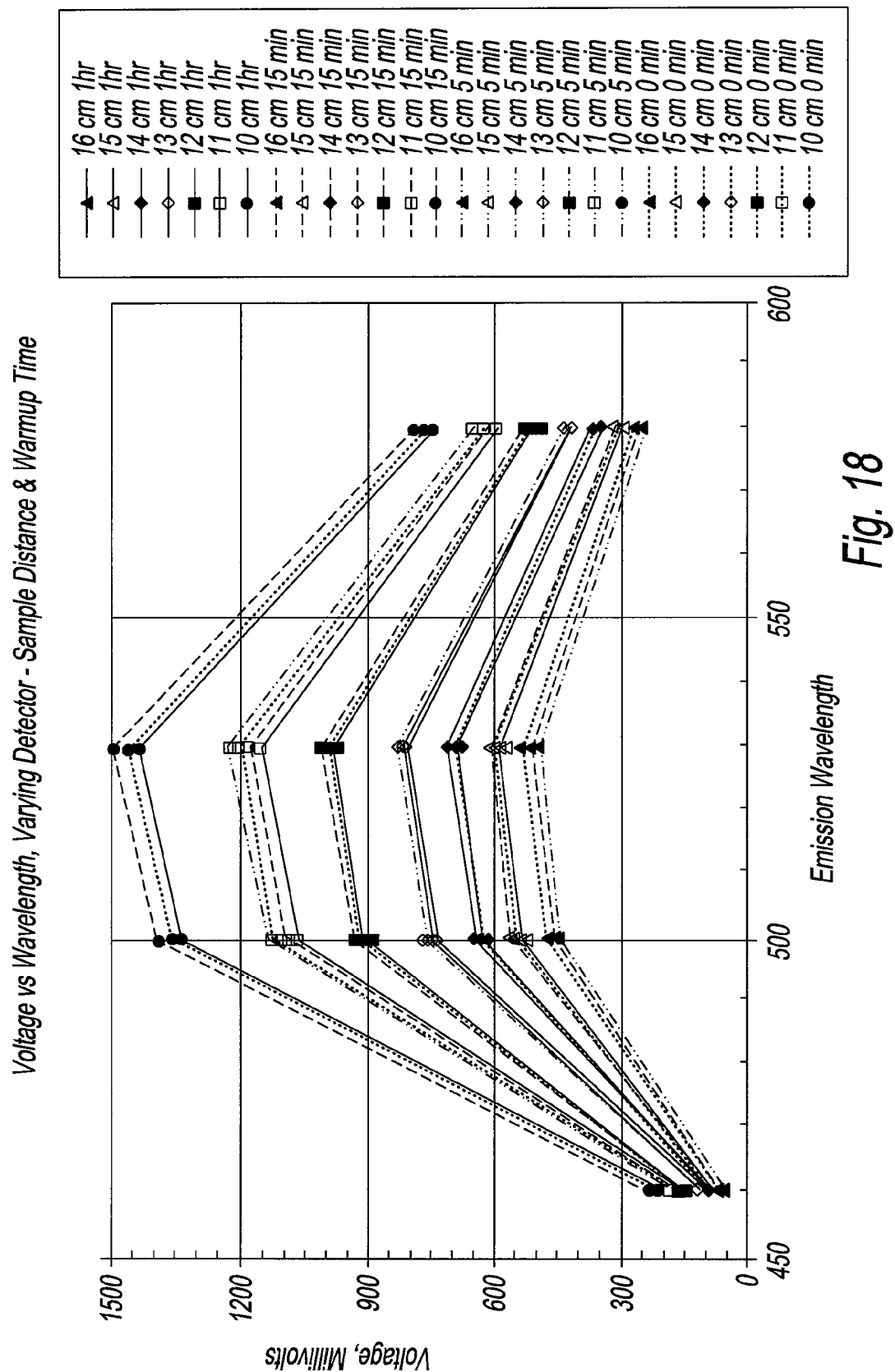
FIG. 18 is a plot of not-normalized discrete spectra for example (6)
Figure 19:
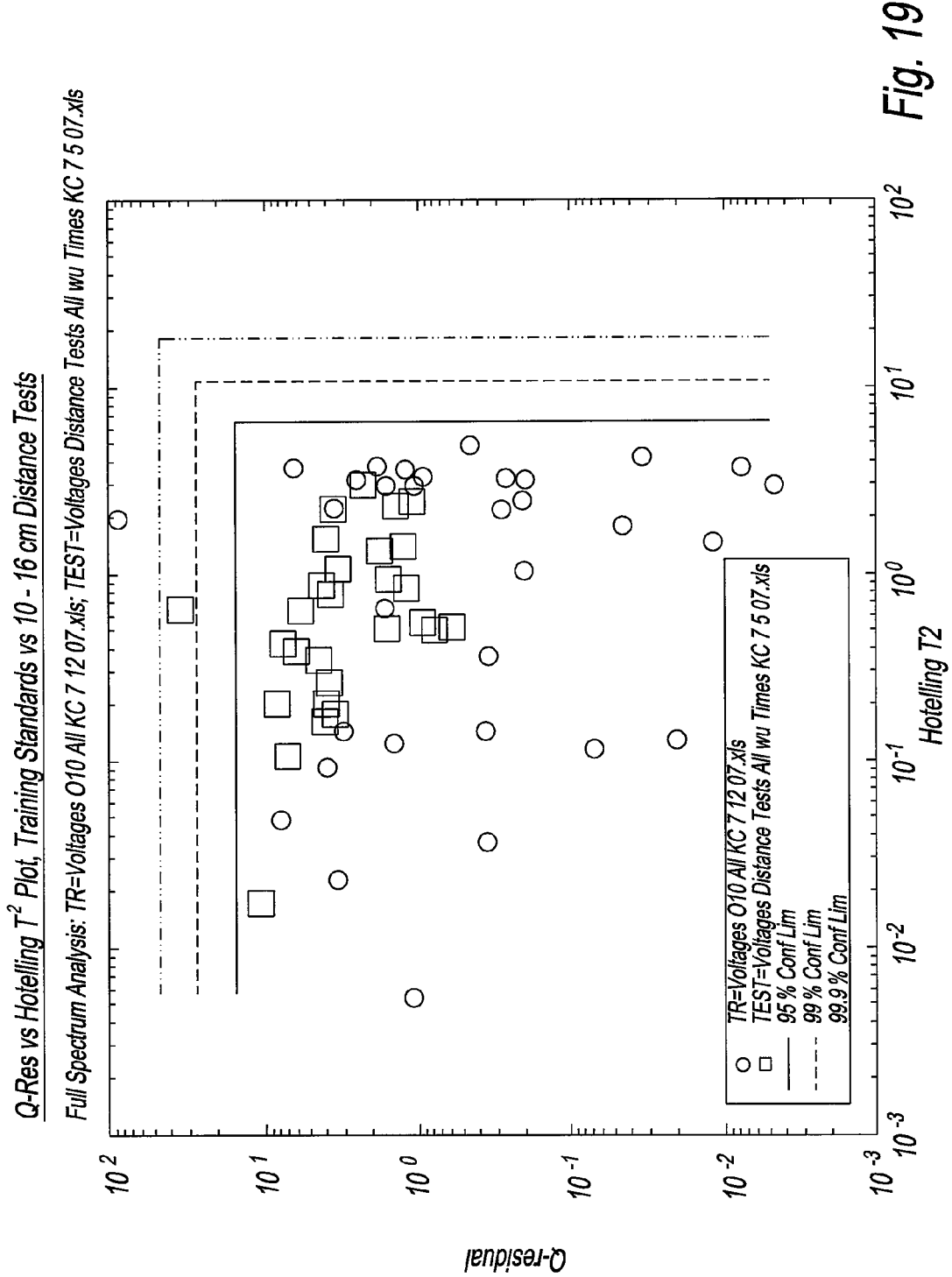
FIG. 19 is a plot of Q-residual versus Hotelling's $T^2$ for example (6).

One of the designated "counterfeit" prints was used to investigate the effect of distance between the print sample and the detector on the variability of the normalized data, which may affect the ability of the method to distinguish "counterfeit" from "authentic" prints. FIG. 18 shows a plot of emission voltage versus filter wavelength for the un-normalized voltage data at various measurement distances and instrument warm-up times. This plot reveals a wide variation in the data. After normalization, and PCA analysis of the data, the Q-residual and $T^2$ values for the measurements at different distances were compared to the values and limits obtained for a model at a specific distance, as shown in FIG. 19. The plot shows that the ability to separate counterfeit from authentic samples is unaffected by distance variation in the measurements.

The present invention having been thus described with particular reference to the preferred forms thereof, it will be obvious that various changes and modifications may be made therein without departing from the spirit and scope of the present invention as defined in the appended claims.

What is claimed is:

1. A system for authentication of a mark comprising a plurality of taggants, the system comprising:
    at least one energy source providing energy at at least one wavelength that stimulates the taggants to emit radiation with an intensity versus wavelength distribution;
    a detection apparatus configured to measure an emitted intensity versus wavelength distribution corresponding to the radiation emitted by the taggants using a device that separates the radiation into a plurality of pre-defined, different wavelengths, and provide at least one output signal corresponding to the emitted intensity versus wavelength distribution, wherein the at least one output signal conveys intensities of the radiation at the plurality of pre-defined, different wavelengths; and
    a device including a program that performs a multivariate statistical analysis of the at least one output signal to enable a determination of authenticity of the mark based on a measurement statistic and a predetermined statistical confidence limit, wherein authenticity is designated to be within the limit, and an outlier outside the limit is designated as a counterfeit.

2. The system of claim 1, wherein the predetermined statistical confidence limit is derived by the multivariate statistical analysis of a set of reference taggants that are known to be authentic and correspond to the taggants, and wherein the predetermined statistical limit is selected from the group consisting of: a Q-residual limit, a Mahalanobis distance limit, a Hotelling's $T^2$ limit and any combination thereof.

3. The system of claim 1, wherein the taggants are carried by a substrate.

4. The system of claim 1, wherein the plurality of taggants comprises two taggants.

5. The system of claim 1, further comprising an output device that notifies a user of the authenticity of the mark.

6. The system of claim 1, wherein the detection apparatus is selected from the group consisting of: a detector that detects and filters the output signal, and a spectrometer that measures the emitted intensity versus wavelength distributions and provides the output signal.

7. The system of claim 1, wherein the taggants comprise fluorescent materials.

8. The system of claim 1, wherein the multivariate statistical analysis is selected from the group consisting of: Principal Components Analysis, and other vector based statistical techniques, discriminate analysis, classical least squares, net analyte signal, principal components regression, partial least squares, soft independent modeling of class analogy, and multi-way statistical tools, including, but not limited to, tri-linear decomposition, parallel factor analysis, Tucker models and multi-way Principal Components Analysis.

9. The system of claim 1, wherein the energy source stimulates the taggants with radiation in regions of the electromagnetic spectrum selected from the group consisting of: X-ray, ultraviolet, visible, near infrared, infrared and Raman.

10. A system for authenticating a mark comprising a plurality of taggants, the system comprising:
at least one energy source providing energy at at least one wavelength that stimulates the taggants to emit radiation with an intensity versus wavelength distribution;
a plurality of filters tuned to a plurality of pre-defined, different wavelengths, wherein the plurality of filters simultaneously filters the radiation emitted by the taggants, and produces a plurality of filtered signals, wherein each of the filtered signals conveys an emitted intensity at one of the plurality of pre-defined, different wavelengths;
a plurality of detectors configured to receive the plurality of filtered signals, and to produce at least one output signal that conveys intensities of the radiation at the plurality of pre-defined, different wavelengths;
a device including a program that performs a multivariate statistical analysis of the at least one output signal to provide a measurement statistic that enables a determination of authenticity of the mark based on the measurement statistic and at least one predetermined statistical confidence limit, wherein authenticity is designated to be within the limit, and an outlier outside the limit is designated as a counterfeit; and
an output device that notifies a user of the authenticity.

11. A method for authentication of a mark comprising a plurality of taggants, the method comprising:
providing energy at at least one wavelength to stimulate the taggants to emit radiation with an intensity versus wavelength distribution;
measuring an emitted intensity versus wavelength distribution corresponding to the radiation emitted by the taggants using a device that separates the radiation into a plurality of pre-defined, different wavelengths;
providing at least one output signal corresponding to the emitted intensity versus wavelength distribution, wherein the at least one output signal conveys intensities of the radiation at the plurality of pre-defined, different wavelengths; and executing a program on a device that performs a multivariate statistical analysis of the at least one output signal to provide a measurement statistic that enables a determination of authenticity of the mark based on the measurement statistic and at least one predetermined statistical confidence limit, wherein authenticity is designated to be within the limit, and an outlier outside the limit is designated as a counterfeit.

12. The method of claim 11, wherein the predetermined statistical confidence limit is derived by the multivariate statistical analysis of a set of reference taggants that are known to be authentic and correspond to the taggants, and wherein the predetermined statistical limit is selected from the group consisting of: a Q-residual limit, a Mahalanobis distance limit, a Hotelling's $T^2$ limit and any combination thereof.

13. The method of claim 12, wherein the reference taggants have been subjected to natural or artificially induced aging.

14. The method of claim 11, wherein the taggants are carried by a substrate.

15. The method of claim 11, wherein the taggants comprise two taggants.

16. The method of claim 11, wherein the taggants comprise a structure selected from the group consisting of: blend, layered, interspersed and patterned regions.

17. The method of claim 11, further comprising notifying a user of the authenticity.

18. The method of claim 11, wherein the taggants comprise fluorescent materials.

19. The method of claim 11, wherein the multivariate statistical analysis is selected from the group consisting of: Principal Components Analysis, and other vector based statistical techniques, discriminate analysis, classical least squares, net analyte signal, principal components regression, partial least squares, soft independent modeling of class analogy, and multi-way statistical tools, including, but not limited to, tri-linear decomposition, parallel factor analysis, Tucker models and multi-way Principal Components Analysis.

20. The method of claim 11, wherein the taggants are stimulated with radiation in regions of the electromagnetic spectrum selected from the group consisting of: X-Ray, ultraviolet, visible, near infrared, infrared and Raman.

21. The method of claim 11, further comprising preprocessing the at least one output signal by normalizing the intensity versus wavelength distribution to unit area to compensate for signal variation due to distance of the taggants from a detector that detects the emitted radiation.

22. The method of claim 11, wherein the stimulating step provides an excitation that is selected from the group consisting of: (a) shorter wavelength ($\lambda$), higher energy, than the emission of the taggants and (b) longer wavelength ($\lambda$), lower energy, than the emission of the taggants.

23. The method of claim 11, further comprising:
irradiating a series of taggants to emit radiation with intensity versus wavelength distributions;
measuring the emitted radiation of each of the taggants and recording in a taggant file of a memory of a computer a radiation intensity versus wavelength distribution for each of the taggants;
selecting a plurality of the taggants from the taggant file that have emitted radiation intensity versus wavelength distributions which are distinguishable by the method; and
applying the selected taggants to a substrate to form the mark.

24. The method of claim 23, wherein the plurality of taggants is selected additionally based on an emission elicited by the radiation from the group consisting of: the substrate and a dispersive medium.

25. The method of claim 24, further comprising irradiating a series of substrates and a series of dispersive media, measuring for each of the substrates and each of the dispersive media an emitted radiation intensity distribution over a wavelength range at which the emission occurs for each of the taggants, recording the emitted radiation intensity distribution for each of the substrates and for each of the dispersive media in a substrate file and a dispersive medium file, respectively, and selecting the substrate and the dispersive medium from the substrate file and the dispersive medium file, respectively, so that the radiation intensity versus wavelength distributions of the selected taggants are distinguishable in the presence of the emitted radiation of the selected substrate and the selected dispersive medium.

26. The system of claim 1, wherein the device that separates the radiation comprises:
a wavelength scanning device configured to separate the captured radiation over a range of wavelengths that includes a plurality of different distinct wavelengths.

27. The system of claim 1, wherein the device that separates the radiation comprises:
a plurality of filters tuned to the plurality of pre-defined, different wavelengths, wherein the plurality of filters simultaneously filters the radiation emitted by the taggants, and produces a plurality of filtered signals, wherein each of the filtered signals conveys an emitted intensity at at least one of the plurality of pre-defined, different wavelengths.

* * * * *